US011428151B2

(12) United States Patent
Osborne et al.

(10) Patent No.: US 11,428,151 B2
(45) Date of Patent: Aug. 30, 2022

(54) SPLIT CYCLE ENGINE

(71) Applicant: Dolphin N2 Limited, Shoreham-By-Sea (GB)

(72) Inventors: Richard Osborne, West Sussex (GB); Ken Pendlebury, West Sussex (GB); Matthew Keenan, West Sussex (GB); Andrew Atkins, Shoreham-By-Sea (GB); Andrew Ward, West Sussex (GB); Robert Morgan, Shoreham By Sea (GB)

(73) Assignee: Dolphin N2 Limited

( * ) Notice: Subject to any disclaimer, the term of this patent is extended or adjusted under 35 U.S.C. 154(b) by 0 days.

(21) Appl. No.: 16/634,008

(22) PCT Filed: Jul. 20, 2018

(86) PCT No.: PCT/GB2018/052060
§ 371 (c)(1),
(2) Date: Jan. 24, 2020

(87) PCT Pub. No.: WO2019/020978
PCT Pub. Date: Jan. 31, 2019

(65) Prior Publication Data
US 2021/0033021 A1 Feb. 4, 2021

(30) Foreign Application Priority Data
Jul. 27, 2017 (GB) ..................................... 1712120

(51) Int. Cl.
*F02B 33/22* (2006.01)
*F02B 3/02* (2006.01)
(Continued)

(52) U.S. Cl.
CPC ................ *F02B 33/22* (2013.01); *F02B 3/02* (2013.01); *F02B 29/0493* (2013.01);
(Continued)

(58) Field of Classification Search
CPC .. F02B 29/04; F02B 29/0481; F02B 29/0493; F02B 33/08; F02B 33/22; F02B 33/44;
(Continued)

(56) References Cited

U.S. PATENT DOCUMENTS 4,233,811 A 11/1980 Masaki
7,958,872 B1 * 6/2011 Schechter .............. F02M 26/35
123/568.11

(Continued)

FOREIGN PATENT DOCUMENTS

EP 0463818 A1 1/1992
GB 2062755 A 5/1981
(Continued)

OTHER PUBLICATIONS

Examination Report for Application No. GB1712120.3, dated Dec. 19, 2017, pp. 1-6.

(Continued)

*Primary Examiner* — Carl C Staubach
(74) *Attorney, Agent, or Firm* — Lerner, David, Littenberg, Krumholz & Mentlik, LLP

(57) ABSTRACT

A split cycle internal combustion engine comprising a compression cylinder accommodating a compression piston; a combustion cylinder accommodating a combustion piston; a crossover passage between the compression cylinder and the combustion cylinder arranged to provide working fluid to the combustion cylinder; a controller arranged to determine a peak temperature of combustion in the combustion cylinder based on a received indication of a peak temperature of combustion in the combustion cylinder; and a coolant system arranged to regulate a temperature of the working fluid supplied to the combustion cylinder; wherein, in response to determining that the peak temperature of combustion exceeds a selected threshold, the controller is con- (Continued)

figured to control the coolant system to regulate the temperature of the working fluid supplied to the combustion cylinder so that a peak temperature of combustion in the combustion cylinder is less than the selected threshold.

20 Claims, 12 Drawing Sheets

(51) Int. Cl.
| | |
|---|---|
| F02B 29/04 | (2006.01) |
| F02B 33/44 | (2006.01) |
| F02B 51/04 | (2006.01) |
| F02D 41/00 | (2006.01) |
| F02D 41/14 | (2006.01) |
| F02D 41/30 | (2006.01) |
| F02D 41/40 | (2006.01) |
| F02M 27/06 | (2006.01) |

(52) U.S. Cl.
CPC ............ F02B 33/44 (2013.01); F02B 51/04 (2013.01); F02D 41/0002 (2013.01); F02D 41/1446 (2013.01); F02D 41/1498 (2013.01); F02D 41/3023 (2013.01); F02D 41/401 (2013.01); F02M 27/06 (2013.01); *F02D 2200/021* (2013.01); *F02D 2200/023* (2013.01); *F02D 2200/024* (2013.01)

(58) Field of Classification Search
CPC ............... F02B 3/02; F02D 2200/021; F02D 2200/023; F02D 2200/024; F02D 41/0002; F02D 41/1446; F02D 41/401; F02M 25/00; F02M 25/025
See application file for complete search history.

(56) References Cited

U.S. PATENT DOCUMENTS

| | | | | |
|---|---|---|---|---|
| 10,661,875 | B2* | 5/2020 | Bellio | B63H 23/10 |
| 2009/0038597 | A1* | 2/2009 | Phillips | F01L 1/465 |
| | | | | 123/70 R |
| 2010/0263646 | A1* | 10/2010 | Giannini | F02B 33/22 |
| | | | | 123/70 R |
| 2011/0094462 | A1* | 4/2011 | Durrett | F02B 47/10 |
| | | | | 123/90.15 |
| 2011/0192367 | A1 | 8/2011 | Reitz et al. | |
| 2012/0103311 | A1* | 5/2012 | Anders | F02B 21/00 |
| | | | | 123/563 |
| 2012/0103314 | A1* | 5/2012 | Jackson | F25J 1/0228 |
| | | | | 123/70 R |
| 2012/0255296 | A1* | 10/2012 | Phillips | F02B 21/02 |
| | | | | 60/526 |
| 2013/0220245 | A1 | 8/2013 | Uzkan | |
| 2014/0026855 | A1 | 1/2014 | Gehrke | |
| 2014/0096734 | A1 | 4/2014 | Dudek | |
| 2014/0366837 | A1 | 12/2014 | Wawrzeniak | |
| 2015/0252718 | A1* | 9/2015 | Kristani | F02B 41/10 |
| | | | | 60/605.1 |
| 2018/0023465 | A1* | 1/2018 | Jackson | F02B 33/20 |
| | | | | 123/70 V |
| 2019/0368415 | A1* | 12/2019 | Morgan | F02B 47/02 |
| 2020/0049058 | A1* | 2/2020 | Atkins | B01D 29/52 |
| 2020/0124003 | A1* | 4/2020 | Atkins | F02M 53/046 |

FOREIGN PATENT DOCUMENTS

| | | |
|---|---|---|
| GB | 2535693 A | 8/2016 |
| WO | 2016120598 A1 | 8/2016 |

OTHER PUBLICATIONS

International Search Report for Application No. PCT/GB2018/052060, dated Dec. 3, 2018, pp. 1-6.
Search and Examination Report for Application No. GB1712120.3, dated Sep. 1, 2017, pp. 1-7.
Search and Examination Report for Application No. GB1809659.4, dated Jul. 11, 2018, pp. 1-5.
Search and Examination Report for Application No. GB1809661.0, dated Jul. 11, 2018, pp. 1-5.
Written Opinion for Application No. PCT/GB2018/052060, dated Dec. 3, 2018, pp. 1-9.
Supplemental European Search Report for EP18749478 completed Apr. 6, 2021; 2 pages.
Written Opinion for EP18749478.6 dated Apr. 19, 2021; 5 pages.

* cited by examiner

SPLIT CYCLE ENGINE

CROSS REFERENCE TO RELATED APPLICATIONS

The present application is a national phase entry under 35 U.S.C. § 371 of International Application No. PCT/GB2018/052060, filed Jul. 20, 2018, published in English, which claims priority from Great Britain Patent Application No. 1712120.3, filed Jul. 27, 2017, the disclosures of which are incorporated by reference herein.

FIELD OF THE INVENTION

The present disclosure relates to a split cycle internal combustion engine and method of operating the same.

BACKGROUND

Conventional internal combustion engines operate based on the Otto and Diesel cycles. Such cycles are associated with a fundamental tension between increases in efficiency (and thus performance) and the generation of emissions of NOx, particulates and Carbon Dioxide. Modern day regulations on such emissions are growing increasingly strict as concerns over atmospheric pollution and global warming are rising. From a review of such engine cycles, it can be seen that increasing efficiency of a cycle leads to increased temperatures, which in turn lead to increased NOx formation and a material performance limitation on that efficiency. In order to mitigate NOx formation, it has been proposed that it is necessary to introduce extra plant complexity in the form of after treatment of the exhaust.

For both of the Otto and the Diesel cycles, the efficiency is predicated on the pressure at the end of compression. The Diesel cycle efficiency is also dependent on a rate of combustion, as the rpm and combustion rate influence a volume ratio between the start and end of combustion. Increasing the efficiency of modern engines is therefore also met with practical material limitations. This is because the peak temperatures and pressures associated with the engine may reach very high levels.

The formation of NOx compounds occurs in areas where the temperature of an air fuel mixture rises above 2100K. For instance, this may occur for localised 'hot spots' or it may be on a larger scale, e.g. throughout the whole of an engine cylinder. NOx compounds are linked to human respiratory health issues and so production of such compounds and emission of these compounds into the atmosphere poses a significant health risk. Also, the formation of these compounds is endothermic so they are inherently of no use with regards to maximising conversion of chemical energy to work.

GB Patent Application Nos. 1622114.5, 1706792.7 and 1709012.7 disclose a split cycle internal combustion engine which uses a coolant injector for cryogenic fluids (fluids which have been condensed into its liquid phase via a refrigeration process).

SUMMARY OF THE INVENTION

Aspects of the invention are as set out in the independent claims and optional features are set out in the dependent claims. Aspects of the invention may be provided in conjunction with each other and features of one aspect may be applied to other aspects.

FIGURES

Aspects of the disclosure will now be described, by way of example only, with reference to the drawings, in which.

SPECIFIC DESCRIPTION

Figure 1:
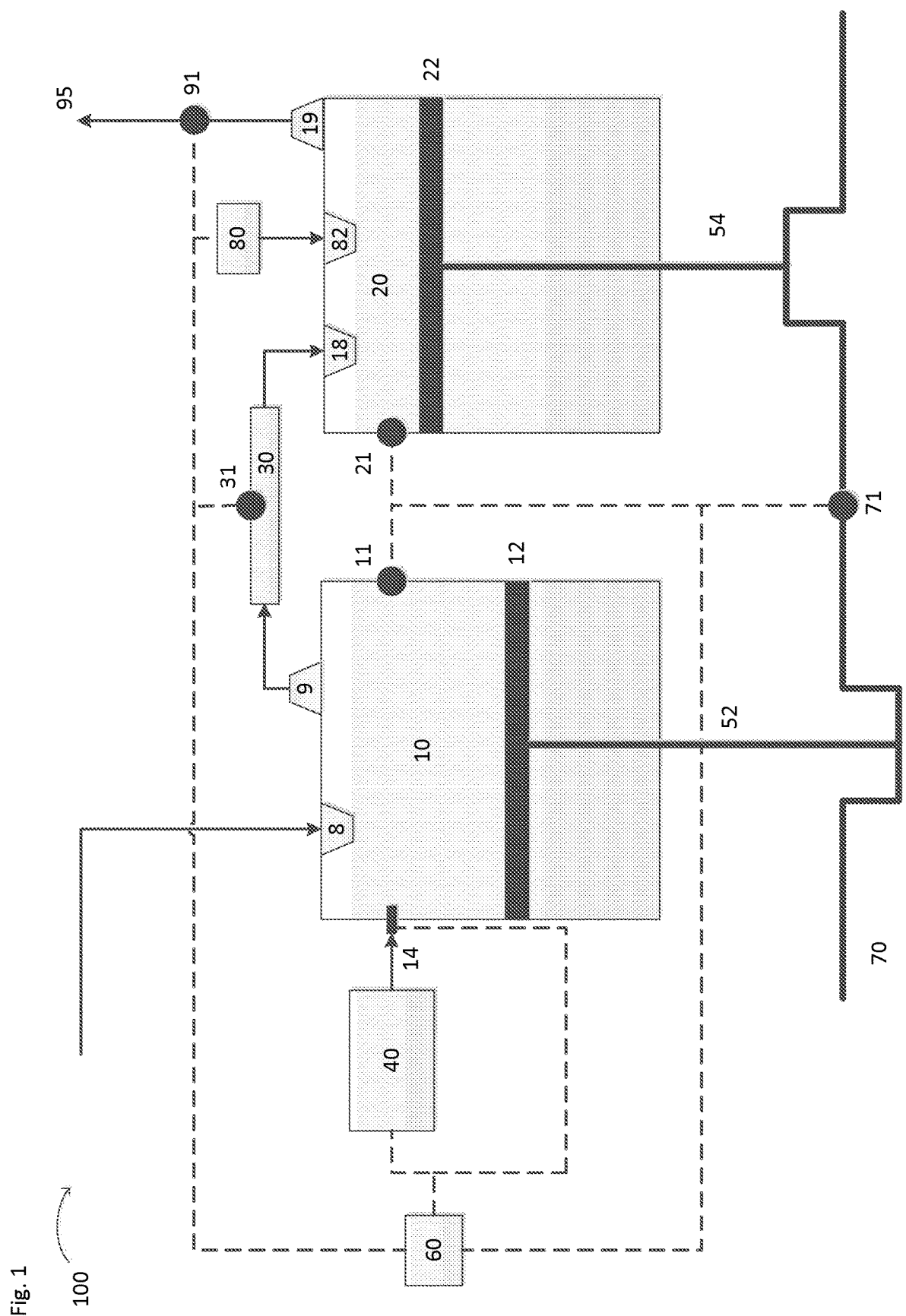
FIG. 1 shows a schematic diagram of an exemplary split cycle internal combustion engine apparatus.

In one example, a split cycle internal combustion engine is disclosed comprising a controller configured to control a coolant system so that a peak temperature of combustion in a combustion cylinder is below a selected threshold. The controller may control a peak temperature of combustion to inhibit generation of $NO_x$ and particulates during combustion, this has a clear environmental benefit as these chemicals are known to be damaging to human health.

In one example, a split cycle internal combustion engine is disclosed comprising a controller configured to control opening and closing of an inlet valve for controlling the flow of working fluid into a combustion cylinder. The controller may control the inlet valve to open and close at selected times to control a peak temperature of combustion to inhibit generation of $NO_x$ and particulates during combustion, this has a clear environmental benefit as these chemicals are known to be damaging to human health.

In one example, a split cycle internal combustion engine is disclosed comprising a controller configured to control a reactivity adjuster to adjust the reactivity of fuel based on a received indication of operating conditions of the engine. The controller may control the reactivity adjuster to increase reactivity of the fuel when fuel reactivity is low. This may enable increased efficiency as combustion of fuel may be achieved for a greater proportion of the fuel.

In one example, a split cycle internal combustion engine is disclosed comprising a controller configured to control the timing of injection for a fuel injector for injecting fuel into a combustion cylinder. The controller may control timing of the injector to control a peak temperature of combustion in the combustion cylinder. This may enable the controller to inhibit generation of $NO_x$ and particulates during combustion, as lower peak temperatures could be achieved. This has a clear environmental benefit as these chemicals are known to be damaging to human health.

In one example, a split cycle internal combustion engine is disclosed comprising a controller configured to control a coolant system based on an estimate for the peak temperature of combustion, so that a peak temperature of combustion remains within a selected range. This may enable the controller to prevent the engine from operating at a sufficiently high temperature that $NO_x$ and particulates are released during combustion, and it may prevent the engine from operating at a sufficiently low temperature for engine performance to be compromised.

In one example, a split cycle internal combustion engine is disclosed comprising a controller configured to control a coolant system so that working fluid in a crossover passage will flow into a combustion cylinder at a speed greater than a speed threshold. This may enable greater mixing of the fuel with the working fluid prior to combustion. This may reduce the richness of the fuel, providing a leaner air-fuel mixture so that complete combustion of the fuel occurs and inhibits generation of particulates, such as soot. It may also reduce the presence of any 'hotspots' where combustion occurs at higher peak temperatures, which produce $NO_x$ or other undesirable pollutants.

In one example, a split cycle internal combustion engine is disclosed comprising a controller configured to control a cross-sectional area defined by an inlet valve to a combustion cylinder so that working fluid flows into the combustion cylinder at a speed greater than a speed threshold. This may enable greater mixing of the fuel with the working fluid prior to combustion. This may reduce the richness of the fuel and reduce the presence of any 'hotspots' where combustion produces $NO_x$ or particulates.

FIG. 1 shows a first example of a split cycle internal combustion engine 100 arranged to control a peak temperature of combustion so that it is below a selected threshold. The engine 100 is arranged to provide an indication of a peak temperature of combustion to a controller 60 which determines, based on this indication, a peak temperature of combustion. Based on the determined peak temperature of combustion, the controller 60 controls a coolant system to regulate a temperature of working fluid supplied to a combustion cylinder 20 of the engine 100. In particular, the coolant system may be arranged to control this temperature so that working fluid in a crossover passage 30 between a compression cylinder 10 and a combustion cylinder 20 of the engine 100 is cool enough that when this working fluid is used in the combustion cylinder 20, as part of the combustion process, a peak temperature of combustion does not exceed a selected threshold. The controller 60 may operate based on a feedback loop which controls the operation of the coolant system so that the temperature of the working fluid to be supplied to the combustion cylinder 20 may be controlled to be within a selected range. This may enable the peak temperature of combustion to be controlled so that, for example, generation of NOx compounds may be inhibited. The feedback loop may also be based on a cooling threshold, wherein in response to the controller determining that the peak temperature of combustion is below the cooling threshold the controller controls the coolant system to regulate the temperature of the working fluid so that the peak temperature of combustion exceeds the cooling threshold. This may enable the controller to control the engine to operate within a selected peak temperature range.

As illustrated, FIG. 1 shows a split cycle internal combustion engine 100 apparatus comprising a compression cylinder 10 and a combustion cylinder 20. The compression cylinder 10 accommodates a compression piston 12, which is connected via a connecting rod 52 to a respective crank on a portion of a crank shaft 70. The combustion cylinder 20 accommodates a combustion piston 22, which is coupled via a connecting rod 54 to a respective crank on a portion of the crank shaft 70. The compression cylinder 10 is coupled to the combustion cylinder 20 via a crossover passage 30. The crossover passage 30 may comprise a recuperator, which may be used for heat transfer. The compression cylinder 10 comprises an inlet port 8 for receiving fluid from outside the engine 100, and an outlet port 9 coupled to the crossover passage 30. The outlet port 9 comprises a valve, for example a non-return valve so that compressed fluid cannot flow back into the compression cylinder 10. The combustion cylinder 20 comprises an inlet valve 18, which is also coupled to the crossover passage 30, and an exhaust valve 19 for passing exhaust from the combustion cylinder 20 to an exhaust. These couplings provide a fluid flow path between the compression cylinder 10 and the combustion cylinder 20 via the crossover passage 30.

The engine 100 also comprises a coolant system. The coolant system is illustrated as comprising a liquid coolant reservoir 40 coupled to the compression cylinder 10 via a coolant injector 14, which defines a liquid flow path. The coolant system may also comprise an injector for injecting coolant into the crossover passage 30, although this is not illustrated in FIG. 1. The coolant system may also comprise use of heat transfer via a recuperator. For example, this may comprise utilising heat in the exhaust from the combustion cylinder to heat the recuperator. It may comprise utilising the recuperator to transfer heat away from the split cycle internal combustion engine 100. The engine 100 also comprises a fuel reservoir 80 coupled to the combustion cylinder 20 via a fuel injector 82 so that a fluid flow path is defined between the fuel reservoir 80 and the combustion cylinder 20.

The engine 100 comprises a controller 60 and a plurality of sensors, which are illustrated as black dots coupled to the controller 60. However, it is to be appreciated that the sensors illustrated are only exemplary and there could be a different number of sensors or they could be placed in different locations. For example, the inlet port 8 may also comprise a temperature sensor. The sensors could be coupled to the controller 60 through physical wires or could be connected wirelessly. In the example shown in FIG. 1 there is a compression sensor 11 within the compression cylinder 10. The compression sensor 11 may for example be mounted proximate to the air inlet port 8 or proximate to the coolant injector 14. The compression sensor 11 may comprise a temperature sensor. The example engine 100 shown in FIG. 1 also comprises a combustion sensor 21 within the combustion cylinder 20. The compression sensor 21 may comprise a temperature sensor; it may comprise a pressure sensor. Also illustrate is a crossover sensor 31 within the crossover passage 30. The crossover sensor 31 may comprise a temperature sensor; it may comprise a pressure sensor. Additionally, the engine 100 comprises a crank sensor 71 mounted to the crankshaft 70. The crank sensor may provide an indication of torque demand from the engine. Also illustrated is an exhaust sensor 91 downstream of the exhaust valve 19 of the combustion cylinder 20. The exhaust sensor 91 may comprise a temperature sensor; it may comprise a pressure sensor; it may comprise a lambda sensor configured to provide an indication of $NO_x$ concentration in the exhaust of the engine. In some examples, the liquid coolant reservoir 40 may also comprise a sensor, for example, for measuring a quantity, such as mass, of liquid contained in the reservoir 40. The controller 60 is also coupled to the coolant injector 14, and the fuel injector 82 and/or reservoir 80.

The sensors are configured to send at least one signal to the controller 60 providing an indication of at least one parameter associated with the engine 100. A parameter of the engine 100 may comprise a temperature of working fluid in the engine (in different locations, e.g. exhaust, compression cylinder 10, crossover passage 30 etc.). It may comprise a pressure of working fluid in the engine; it may comprise a demand on the engine; it may comprise a value for $NO_x$ generation in the engine; it may comprise timings for the opening and closing of the inlet valve 18; it may comprise timing for the injection of fuel into the combustion cylinder. A parameter of the engine 100 may comprise an indication of engine knocking, for example, this may be based on a received audio signal of the engine running. Engine knocking may occur when the fuel does not ignite at the correct time during the cycle of the piston, and may be detected based on listening to the noise of the engine, and thus an indication of engine knocking may be considered a parameter of the engine.

For example, in the example shown in FIG. 1, the compression sensor 11 is configured to measure at least one parameter associated with the compression cylinder 10. The combustion sensor 21 is configured to measure at least one parameter associated with the combustion cylinder 20. The crossover sensor 31 is configured to measure at least one parameter associated with the crossover passage 30. Additionally, the crank sensor 71 is configured to measure RPM for the engine 100, and the exhaust sensor 91 is configured to measure at least one parameter of exhaust gas expelled through the exhaust valve 19 of combustion cylinder 20. Such measurements of the at least one parameters provide an indication of a peak temperature of combustion in the combustion cylinder 20. Each sensor may provide said indication of peak temperature to the controller 60 for the controller 60 to determine the peak temperature of combustion in the combustion cylinder 20.

The engine 100 is arranged such that air is drawn into the compression cylinder 10 through the inlet port 8 of the compression cylinder 10. The compression piston 12 is arranged to compress this air, and during the compression phase, liquid coolant may be added into the compression cylinder 10. The crossover passage 30 is arranged to receive the working fluid via the outlet port 9 and pass it into the combustion cylinder 20 via the inlet valve 18. The engine 100 is further arranged to add fuel from the fuel reservoir 80 to the working fluid in the combustion cylinder 20 via the fuel injector 82, and combust the mixture of fuel and working fluid (for example via operation of an ignition source, not shown) to extract useful work via turning of the crankshaft 70.

The fuel reservoir 80 is connected to the controller 60 so that the controller 60 controls the delivery of fuel into the combustion cylinder 20. In some examples, the controller 60 is configured to determine the amount of fuel to be injected based on a received indication of at least one parameter of the engine 100. For example the controller 60 may be configured to obtain the indication of the at least one parameter via a signal indicative of a peak temperature of combustion received from the exhaust sensor 91, or a signal indicative of engine demand received from the crank sensor 71.

In operation, the controller 60 is configured to receive an indication of a peak temperature of combustion. The signal is received from at least one of the sensors illustrated in FIG. 1. For instance, the controller 60 may receive an indication of a temperature in the exhaust from the exhaust sensor 91. In the event that the controller is receiving an indication from a sensor which does not directly measure the peak temperature of combustion, the controller determines an estimate for peak temperature of combustion in the combustion cylinder 20 based on the received indication. For example, the received indication of temperature in the exhaust may be used to infer the peak temperature of combustion in the combustion cylinder. In the event that the controller receives an indication from a sensor which directly measures a peak temperature of combustion, e.g. combustion sensor 20, the controller may use the indication of peak temperature rather than separately determining the peak temperature.

The peak temperature of combustion typically occurs towards the end of the movement of the piston 22 from Top Dead Centre ('TDC') to Bottom Dead Centre ('BDC'). In the event that the controller 60 receives the indication from a sensor which cannot directly measure this peak temperature (e.g. which is not in the combustion cylinder 20), the controller 60 is configured to determine an estimate the peak temperature based on the received indication. This may comprise use of a mathematical model which can estimate a peak temperature for combustion based on a value for a parameter of the engine (e.g. a temperature of the working fluid in the crossover passage). For example, such a model may comprise determining a value based on previous data for heat generation throughout the cycle of the engine and/or dissipation of heat and consequential cooling after combustion has occurred. The sensor may measure a parameter of the system and/or the working fluid (e.g. a temperature, a pressure) and this may be the indication provided to the controller 60. Based on the indication, the controller 60 may use known thermodynamic relationships to determine an estimate for the peak temperature in the combustion cylinder 20. For example, based on a received indication of pressure and temperature of working fluid, a density for the working fluid may be determined (e.g. based on the equation for state linking pressure, temperature and density).

In an example, the controller 60 may receive an indication of the peak temperature of combustion from a sensor measuring a parameter of the working fluid after combustion. For instance, the measurement may be made by the exhaust sensor 91. The exhaust sensor 91 may be configured to measure the temperature of working fluid in the exhaust. Post-combustion temperature provides an indication of a peak temperature of combustion. An estimate of the peak temperature of combustion may be determined based on the post-combustion temperature using previous data, e.g. using a look-up table. It is to be appreciated that this may provide a good approximation to the peak temperature of the working fluid during combustion, as the time at which the working fluid flows through the exhaust valve 19 from the combustion cylinder 20 will be very shortly after the time at which the peak temperature of combustion was reached. The exhaust sensor 91 may therefore measure a post-combustion temperature, and based on this measurement, provide an indication of the peak temperature of combustion to the controller 60. The controller 60 then determines, based on the post-combustion temperature, a peak combustion temperature. The peak combustion temperature is greater than the post-combustion temperature. The peak combustion temperature may be determined using a look-up table comprising a mapping between values for post-combustion temperatures and corresponding values for peak combustion temperatures.

In another example, the controller 60 may receive an indication of the peak temperature of combustion from a sensor measuring a parameter of the working fluid prior to combustion. For instance, the measurement may be made by a supply sensor, wherein a supply sensor may refer to any sensor which provides an indication of a parameter of the engine or working fluid prior to combustion, for example the indication may be from the compression sensor 11 or the crossover sensor 31. The crossover sensor 31 may be configured to measure the temperature of the working fluid in the crossover passage 30 prior to it flowing into the combustion cylinder 20. The crossover sensor 31 may therefore measure a pre-combustion temperature of the working fluid, and provide an indication of this to the controller 60. The controller 60 then determines, based on the pre-combustion temperature an estimate for the peak temperature of combustion in the combustion cylinder 20. The pre-combustion temperature is less than the peak combustion temperature. The controller 60 may determine an estimate for the peak combustion temperature using a look-up table comprising a mapping between values for pre-combustion temperatures and corresponding values for peak combustion temperatures. The values in the mapping may be determined using a mathematical model modelling the thermodynamics of the system to predict the temperatures. They may comprise values determined empirically.

It is to be appreciated that the look-up table used in either example may also comprise other parameters. The look-up table may therefore enable the controller 60 to determine an estimate of the peak temperature of combustion based on present conditions of the engine 100 and a temperature of the working fluid (e.g. the pre-combustion or post-combustion temperature). For example, one of the other parameters may comprise an indication of a demand on the engine 100, which may be determined based on a signal received from the crank sensor 71. One parameter may comprise a timer indicative of the duration of time for which the engine 100 has been running. This may provide an indication for the temperature of the engine, as during start-up of the engine operational temperatures will be lower whilst the engine heats up. The time the engine has been running may therefore provide an indication of a likely temperature of the engine itself. One parameter may comprise an indication of an overall temperature of the engine 100. It is to be appreciated that the other parameters may comprise any suitable parameter which may influence the determination of the peak value of combustion in the combustion cylinder 20. For example, during start-up of the engine 100, the combustion cylinder 20 may be cooler than during normal operation, and so the increase in temperature of the working fluid between the pre-combustion temperature and the peak combustion temperature may be smaller than when the combustion cylinder 20 is hotter after extended use or in cases of high demand. Based on an indication of the temperature of the engine 100 (e.g. the combustion cylinder 20), or for example a timer which indicates how long the engine 100 has been running, the mapping from the pre-combustion temperature to the peak combustion temperature may provide a more accurate estimation of the peak temperature of combustion in the combustion cylinder 20.

The controller 60 is arranged to control the coolant system to cool the working fluid in response to determining that a temperature of the working fluid is greater than a selected threshold. During start-up of the engine 100, the engine 100 will be operating at cooler temperatures and so the controller 60 may determine that the estimate of the peak temperature of combustion is well below the selected threshold. In which case, the controller 60 may control the coolant system so that little or no cooling occurs.

Once the engine 100 has progressed from the start-up conditions to a normal mode of operation, the controller 60 is configured to determine the peak temperature of combustion and control the coolant system to regulate the temperature of the working fluid. Controlling the coolant system is based on a feedback loop which comprises routinely monitoring the peak temperature of combustion and controlling cooling of the working fluid so that the peak temperature of combustion does not exceed a selected threshold. In response to determining that the peak temperature of combustion exceeds the selected threshold, the controller 60 is configured to operate the coolant system to increase cooling of the working fluid. In the example shown in FIG. 1, this comprises controlling the coolant injector 14 to inject more coolant into the compression cylinder 10. Although, it is to be appreciated that other ways of controlling the temperature of working fluid may be provided (e.g. by heat transfer using a recuperator). As the working fluid in the compression cylinder 10 is compressed, some of the increase in heat of the working fluid may be absorbed by the injected coolant. The coolant will absorb a certain portion of the heat to overcome its latent heat of vaporisation, which will act to inhibit the increase in temperature in the combustion cylinder 20. Thus, by controlling the quantity of coolant injected into the combustion cylinder 20, the controller 60 can control the heat of the working fluid. In particular, the controller 60 can influence the heat of the working fluid in the crossover passage 30 prior to the working fluid flowing into the combustion cylinder 20.

The selected threshold comprises a criterion for the peak temperature of combustion. The controller may determine whether the criterion is satisfied or not based on a comparison comprising the estimated peak temperature of combustion and the criterion. The selected threshold may be a value for a maximum temperature, such that any peak temperature of combustion greater than this maximum temperature does not satisfy the criterion. The value for the selected threshold may be selected to inhibit the formation of NOx compounds. The controller may compare a value for the peak combustion temperature to the selected threshold, wherein the comparison is based on an average value for the peak temperature of combustion, i.e. a 'global' value for the peak temperature for the entire cylinder. In other examples, the controller may compare a value for the peak combustion temperature to the selected threshold, wherein the comparison is based on a localised peak value for the peak temperature of combustion. The localised peak value may comprise a value for the highest peak temperature of combustion in any region of the combustion cylinder 20. In some examples, the selected threshold may comprise an indication of both values. The selected threshold may require a temperature equal to or less than 2200 Kelvin; it may require a temperature of less than 2150 Kelvin; it may require a temperature of less than 2125 Kelvin; it may require a temperature of less than 2100 Kelvin; it may require a temperature of less than 2075 Kelvin; it may require a temperature of less than 2050 Kelvin; it may require a temperature of less than 2000 Kelvin; it may require a temperature of less than 1900

Kelvin. It is to be appreciated that this value may be dependent on an equivalence ratio for the working fluid and fuel mixture and so may vary.

In response to determining that the peak temperature of combustion is greater than the selected threshold, the controller 60 controls the coolant system to regulate the temperature of the working fluid to be provided to the combustion cylinder 20. As described above, the temperature is regulated using the coolant system. In one example, this may be by increasing the volume of coolant injected into the compression cylinder 10, but additionally or alternatively it may be by controlling heat transfer away from a recuperator in the crossover passage. The controller 60 may be configured to determine the extent of the cooling based on the determined indication of the peak temperature of combustion. The coolant system may be operated in a continuous manner such that the volume of coolant injected is proportional to the amount of cooling required for the temperature of the working fluid to be cooled to less than the selected threshold. It may be operated in a discrete manner such that above a first selected threshold a first volume of coolant is injected, and above a second selected threshold a second volume of coolant is injected. There may be a plurality of such thresholds.

By controlling the coolant system to regulate the peak temperature of combustion in the combustion cylinder 20, the controller 60 may therefore control the split cycle internal combustion engine 100 so that the combustion process is at lower temperatures to reduce production of NOx compounds.

It is to be appreciated that although the controller has been described as controlling the coolant system to inject more coolant, the same result could be achieved in other ways. For example, this may be achieved by injecting a different type of coolant, or coolant at a different temperature. Additionally, it is to be appreciated that the sensors are configured to provide the controller 60 with an indication of a peak temperature of combustion. However, this indication does not have to comprise a temperature, it could comprise a measurement of any suitable thermodynamic parameter from which the peak temperature of combustion could be determined. For example, using known thermodynamic relationships, a value for temperature may be determined based on a value for pressure.

In another aspect, the split cycle internal combustion engine 100 of FIG. 1 may operate using the timing of the inlet valve 18 to regulate the temperature of working fluid in the combustion cylinder 20. The inlet valve 18 is operable to move from a closed state at a first position during the cycle of the piston to an open state at a second position during the cycle of the piston. When the inlet valve 18 is in the open state, working fluid in the crossover passage 30 may flow into the combustion cylinder 20, and when the inlet valve 18 is in the closed state, the working fluid may not. In operation, the controller 60 may select the first and second position based on a selected threshold and/or a cooling threshold. These two positions may be selected so that they are separated by a selected time period; this time period may be constant and fixed and/or it may be variable. Combustion in the combustion cylinder 20 typically occurs at, or very close to the TDC position of the piston during the cycle. The first position is thus selected to be before TDC so that working fluid in the crossover passage 30 has time to flow into the combustion cylinder 20 before combustion occurs. The second position may be selected to be at or before TDC so that combustion provides a greater force on the piston. This is because, at combustion working fluid is expanded which causes the combustion piston 22 to move towards its BDC position. In the event that the inlet valve is still open during combustion, a portion of the working fluid may move back in to the crossover passage rather than provide a force on the combustion piston 22. Thus, if the second position is selected so that the inlet valve is closed before expansion of the working fluid occurs then a greater force will be delivered to the combustion piston 22.

As the first position is before TDC, there will be some compression of working fluid in the combustion cylinder 20 before combustion occurs. This will increase the temperature of this working fluid. The temperature of the working fluid prior to combustion will influence the peak temperature of combustion in the combustion cylinder 20, and thus by controlling this compression-induced heat rise in the combustion cylinder 20, the controller 60 can regulate the peak temperature of combustion in the combustion cylinder 20. The amount of compression-induced heat rise in the combustion cylinder 20 will depend on the first position. The sooner after BDC the first position is, the greater the amount of heating of the working fluid. The controller 60 may therefore select the first position based on a determined amount of heating required. This may be determined based on the determined peak temperature of combustion in the combustion cylinder 20, and thus a desired extra amount of heating for the working fluid to be at a selected temperature prior to combustion, such that the peak temperature of combustion is within a selected range.

For instance, in response to determination of an estimate of the peak temperature of combustion being greater than the selected threshold, the controller 60 selects the first position to be later during the cycle of the piston. In response to determining that the peak temperature of combustion is below a cooling threshold, the controller 60 selects the first position to be earlier during the cycle of the piston so that the working fluid may receive more heating. Likewise, the controller 60 may control the second position based on the peak temperature of combustion and the cooling and selected thresholds.

In another aspect, the split cycle internal combustion engine 100 of FIG. 1 may operate using the timing of the injection of fuel by the fuel injector 82 to regulate the temperature of working fluid in the combustion cylinder 20. Injection of the fuel may occur at an injection position during the cycle of the piston. The injection may occur for a set time period; it may occur for a variable time period; the time period may be based on a volume of fuel to be injected. The controller 60 is configured to select the injection position based on the determined estimate for the peak temperature of combustion. For instance, in response to determining an estimate for the peak temperature of combustion which is greater than the selected threshold, the controller 60 may control the fuel injector 82 to inject fuel at a delayed injection position during the cycle of the piston. The delayed injection position may comprise a position during the cycle of the piston which occurs later than a present injection position. In response to determining an estimate for the peak temperature of combustion which is less than the cooling threshold, the controller 60 may control the fuel injector 82 to inject fuel at an earlier injection position during the cycle of the piston. The earlier injection position may comprise a position during the cycle of the piston which occurs before a present injection position.

Typically, combustion will occur at or very shortly after the TDC position of the combustion piston 22. Controlling the combustion to occur at the TDC position may enable an expanding force to be applied on the combustion piston 22 for a greater length of time, whilst the combustion piston 22 returns to its BDC position. The volume in the combustion cylinder 20 defined by the location of the combustion piston 22 changes during the stroke of the piston, and will be at its lowest at the TDC position of the combustion piston 22. Combustion at this TDC position may result in a greater expansion of the working fluid than combustion at a later position during the cycle of the piston. Combustion closer to TDC may also result in a greater change in temperature from the starting temperature than combustion later on after TDC. As a consequence, a peak temperature of combustion in the combustion cylinder 20 may be greater for an earlier starting combustion. Combustion will not occur without the fuel.

The controller 60 is configured to control the fuel injector 82 to inject fuel into the combustion cylinder 20 at an injection position during the cycle of the piston. The controller may delay injection of the fuel so that it is injected at a later position during the cycle of the piston (e.g. after TDC). Based on the determined estimate for the peak temperature of combustion in the combustion cylinder 20, the controller may determine that the estimate for peak temperature is too high and may result in NOx generation. As a way of regulating the temperature in the combustion cylinder 20, the controller may delay injection of the fuel so that combustion occurs at a later position during the cycle of the piston. The peak temperature of combustion may therefore decrease which may inhibit NOx generation.

In another aspect, the split cycle internal combustion engine 100 of FIG. 1 may operate using the controller 60 to control the coolant system to regulate the peak temperature of the working fluid supplied to the combustion cylinder 20 based on an estimate for the peak temperature of combustion in the combustion cylinder 20. The controller 60 may use the estimate so that the peak temperature of combustion in the combustion cylinder 20 is within a selected range. In particular, during normal operation of the engine 100, the controller may select the selected range so that the peak temperature of combustion in the combustion cylinder is not greater than the selected threshold and/or is not less than the cooling threshold. The selected range may be selected to be a range of values between the cooling threshold and the selected threshold. This may enable the controller 60 to control operation of the engine so that both efficiency and NOx generation satisfy selected criteria.

The controller 60 may determine the estimate for the peak temperature of combustion based on a received indication of a parameter of the engine. For example, the controller 60 may determine the estimate based on a received indication of a demand on the engine. In which case, the controller 60 may predict based on the indication of demand for the engine, and (e.g. an indication of a temperature of working fluid to be supplied to the combustion cylinder 22), an estimate for the peak temperature of combustion that will be reached in the combustion cylinder 20.

The prediction may be based on previous data associated with the engine 100. For example, the controller 60 may access a look-up table comprising a mapping between a value, or values, for at least one engine parameter and a corresponding estimate for peak temperature. The controller 60 may comprise a machine learning element which comprises a model for predicting peak temperatures of combustion based on input data relating to the engine (e.g. parameters for the engine, or a log of measurements for the engine since it started running). This machine learning element may be 'trained' on data for which there is a known peak temperature of combustion associated with the input data. This may enable a prediction model of the machine learning element to learn and update based on training data so that the model may provide a more reliable and accurate system for predicting peak temperatures. Based on this estimate, the controller may control the coolant system so that a peak temperature of combustion in the combustion cylinder 20 is within the selected range.

The split cycle internal combustion engine 100 of FIG. 1 may regulate the temperature of the working fluid in accordance with examples described above. The temperature regulation may be based on a combination of above examples.

Figure 2:
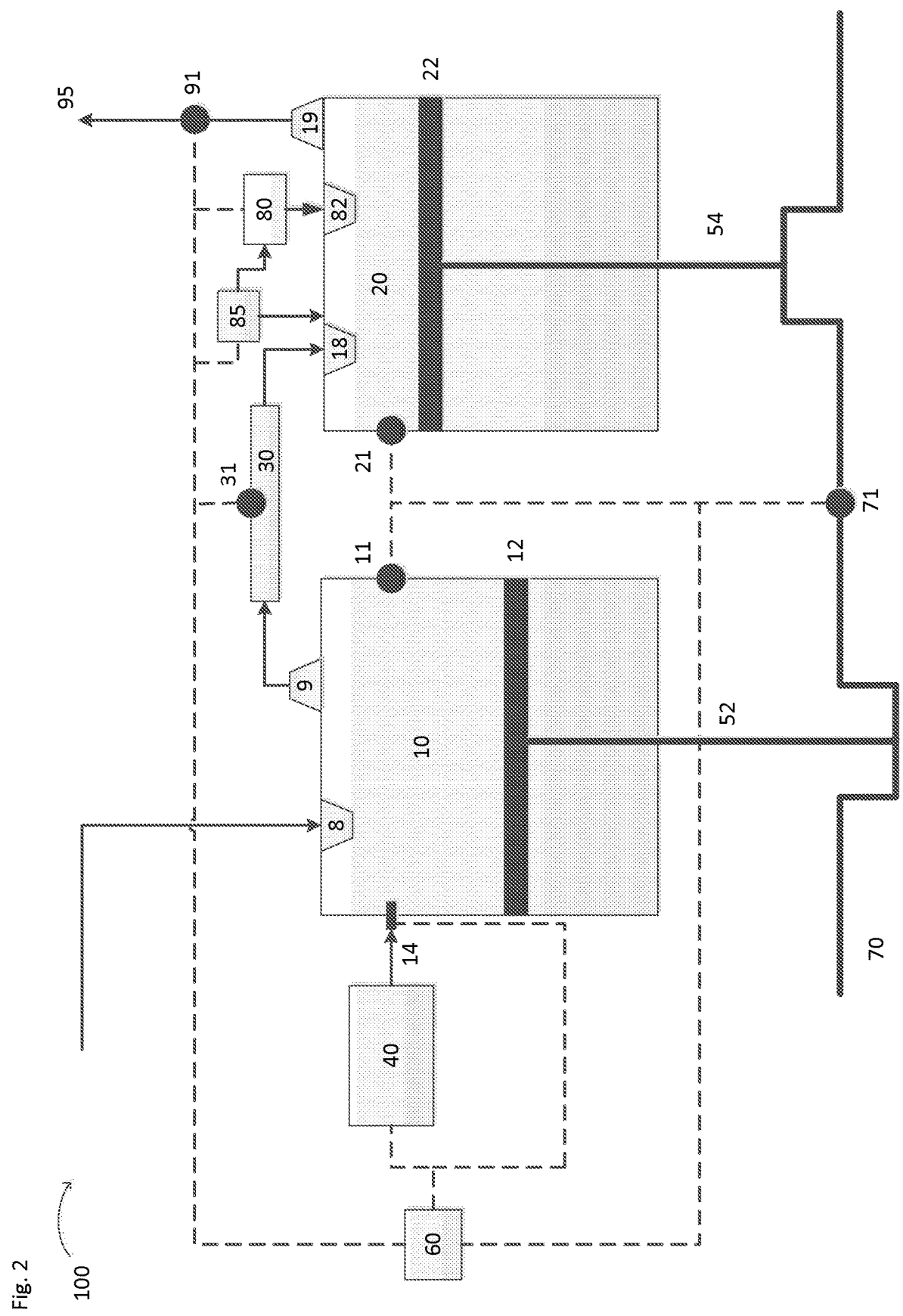
FIG. 2 shows a schematic diagram of an exemplary split cycle internal combustion engine apparatus.

FIG. 2 shows a second example of a split cycle internal combustion engine 100 arranged to control a peak temperature of combustion so that it is below a selected threshold. The engine 100 of FIG. 2 is similar to the engine 100 of FIG. 1 and so components which perform substantially the same functions are associated with the same reference numerals and will not be described again.

The split cycle internal combustion engine 100 of FIG. 2 also comprises a reactivity adjuster 85. The reactivity adjuster 85 is connected to the controller 60 so that the controller 60 may control operation of the reactivity adjuster 85. The reactivity adjuster 85 is operable to adjust the reactivity of a fuel to be used during the combustion process. The reactivity adjuster 85 is illustrated as being operable to act on fuel (e.g. in the fuel reservoir 80) to be injected into the combustion cylinder 20. The reactivity adjuster 85 is also illustrated as being operable to act directly on fuel within the combustion cylinder 20. The reactivity adjuster 85 is operable to increase the ability of a fuel to ignite. This may comprise at least one of: making the fuel more reactive and providing additional means for ignition of the fuel in the combustion cylinder 20. The controller 60 may also control operation of the reactivity adjuster 85 in response to determining that the reactivity of the fuel is greater than an over-reactivity threshold. This may help reduce NOx formation as over-reactive fuel may produce a higher peak temperature of combustion.

In the example shown, the reactivity adjuster 85 comprises a system for directing electromagnetic radiation, e.g. laser or microwave radiation, at the fuel to provide an additional source of ignition for the fuel in the combustion cylinder 20. This may provide a more targeted ignition mechanism and so may enable fuel to ignite in less favourable ignition conditions, such as when the combustion cylinder 20 is colder than an ignition threshold temperature. The controller 60 may be configured to control the reactivity adjuster 85 so that, in response to determining that a temperature in the combustion cylinder 20, and/or a temperature of the working fluid, is less than the ignition threshold, the controller 60 controls the reactivity adjuster 85 to provide an additional source of fuel ignition. The reactivity adjuster 85 may comprise a system for selective energy transfer. The system for selective energy transfer may provide targeted radiation for certain compounds found within the fuel working fluid mixture to increase reaction rates. This may comprise targeted radiation for breaking up compounds which would produce improved combustion, e.g. breaking down $CH_4$ (methane) so that combustion may occur at a lower starting temperature, and thus a peak temperature of combustion may occur at a lower temperature, which in turn may inhibit NOx generation.

In some examples, the reactivity adjuster 85 may comprise a system for providing an oxidising agent or free radical to the fuel. This provision may be in the combustion cylinder 20; it may be in the fuel reservoir 80 (for example, prior to injection of the fuel into the combustion cylinder 20). The provision of an oxidising agent may enable a larger proportion of the fuel to ignite; it may increase the probability of initially igniting the fuel. For example, a suitable oxidising agent may comprise: oxygen or ozone. Although it is to be appreciated that any suitable oxidising agent may be added.

The controller 60 is configured to receive an indication of at least one of a pressure, a density and a temperature of the working fluid, and based on this to determine an ignition parameter of the working fluid. The determined ignition parameter may provide an indication of the ability of the fuel to ignite. For example, the ignition parameter may provide an indication of an expected proportion of the fuel which will ignite. The controller 60 is configured to determine the ignition parameter based on the received indication. For instance, this may comprise using a look-up table to identify, based on one or more values for thermodynamic properties of the working fluid, a value for the ignition parameter. These values may be determined theoretically and/or empirically. For example, the controller 60 may identify that the fuel is less likely to ignite when it is cold, and so, in response to receiving an indication that the temperature of the working fluid is cold, the ignition parameter may be determined to be a low value.

In response to determining that the ignition parameter is below an ignition threshold, the controller 60 is configured to operate the reactivity adjuster 85. Operation of the reactivity adjuster 85 will contribute towards increasing the value for the ignition parameter, and thus to a probability that the fuel will ignite. The controller 60 may be configured to determine the extent of the operation of the reactivity adjuster 85 based on the determined ignition parameter. For instance, the extent of the operation of the reactivity adjuster 85 may be determined based on the size of the difference between the ignition parameter and the ignition threshold. There may be a plurality of ignition thresholds, and the controller 60 may determine the extent of the operation of the reactivity adjuster 85 based on which thresholds the ignition parameter satisfies. The reactivity adjuster 85 may provide benefits in particular during start-up of the engine 100, when the ignition parameter may be below, even considerably below, the ignition threshold. For example, the temperature of the combustion cylinder 20 may be very low, and operation of the reactivity adjuster 85 may enable the fuel to ignite and thus enable combustion to occur at a much lower temperature.

Figure 3:
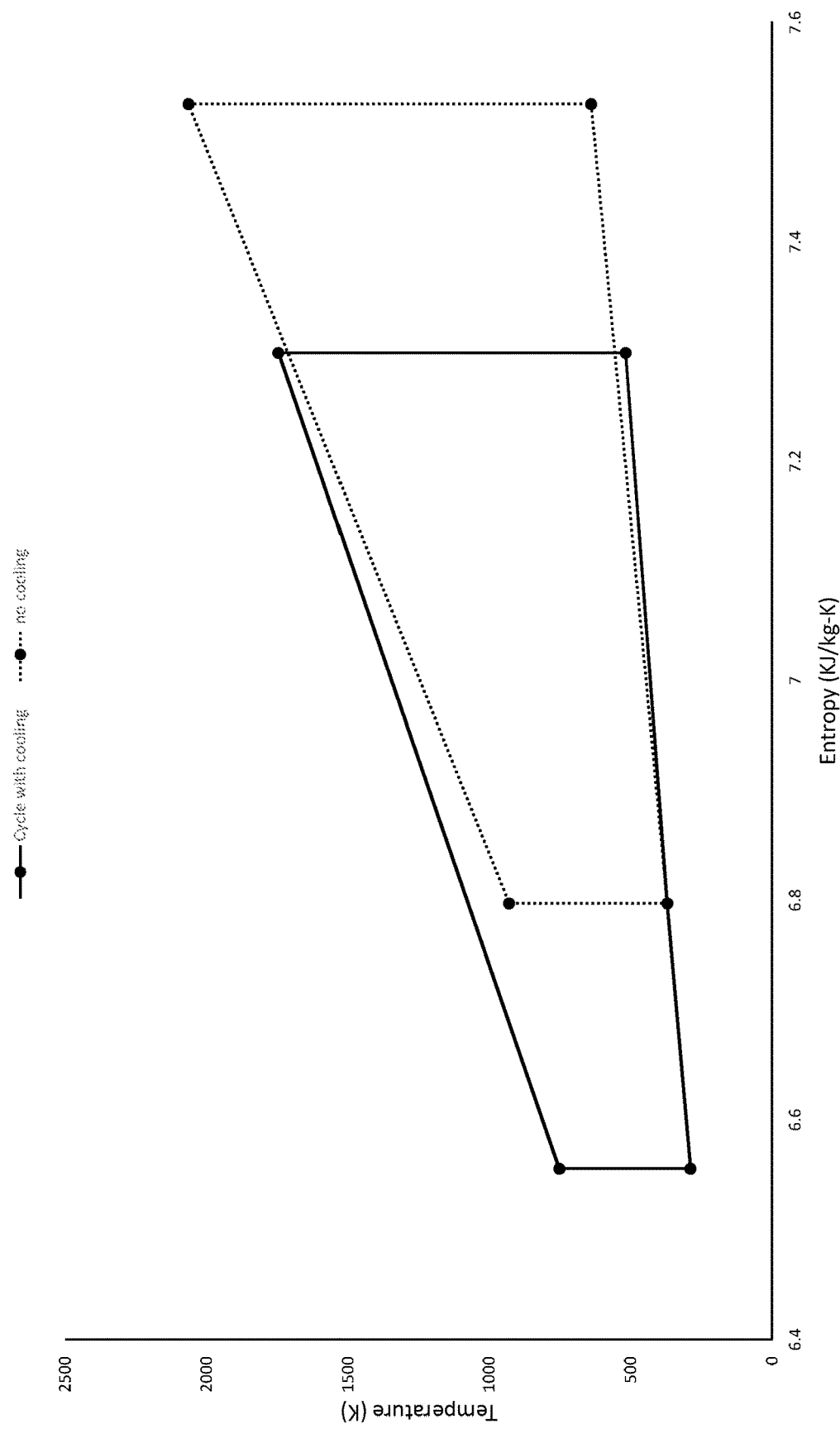
FIG. 3 shows a temperature-entropy diagram for operation of an exemplary split cycle internal combustion engine.

FIG. 3 shows an exemplary temperature-entropy diagram for the operation of a split cycle internal combustion engine as illustrated in FIG. 1 or 2. The dashed line shows the cycle for an engine with no cooling, and the solid line shows the cycle with cooling. This diagram is based on an approximation of the engine using a Nitrogen only cycle. Both cycles produce the same amount of heat output. In the cycle with coolant added, the bottom left point in the cycle has a lower value for both temperature and entropy when compared to the cycle with no cooling. This is due to an increase in mass and decrease in temperature as a consequence of the addition of coolant. Consequently, the top right point in the cycle with cooling is at a lower temperature and entropy to the cycle with no cooling. This point represents the peak temperature of combustion. The amount of cooling may therefore be controlled so that this peak temperature of combustion is below the selected threshold. This may inhibit generation of NOx, but this may avoid an associated decrease in efficiency of the engine, because the same amount of heat is released. This is because a ratio between an initial and final pressure in the combustion cylinder may be the same for both the cycle with cooling and the cycle with no cooling, and engine cycle efficiencies are determined based on such ratios. A slope of the line from the top left point to the top right point in each cycle represents an efficiency of the conversion from thermal energy into pressure. The flatter this slope is the more efficient the conversion is. As can be seen from FIG. 3, the cycle with cooling may provide an increased efficiency for conversion from thermal energy into pressure as the slope is shallower.

Figure 4:
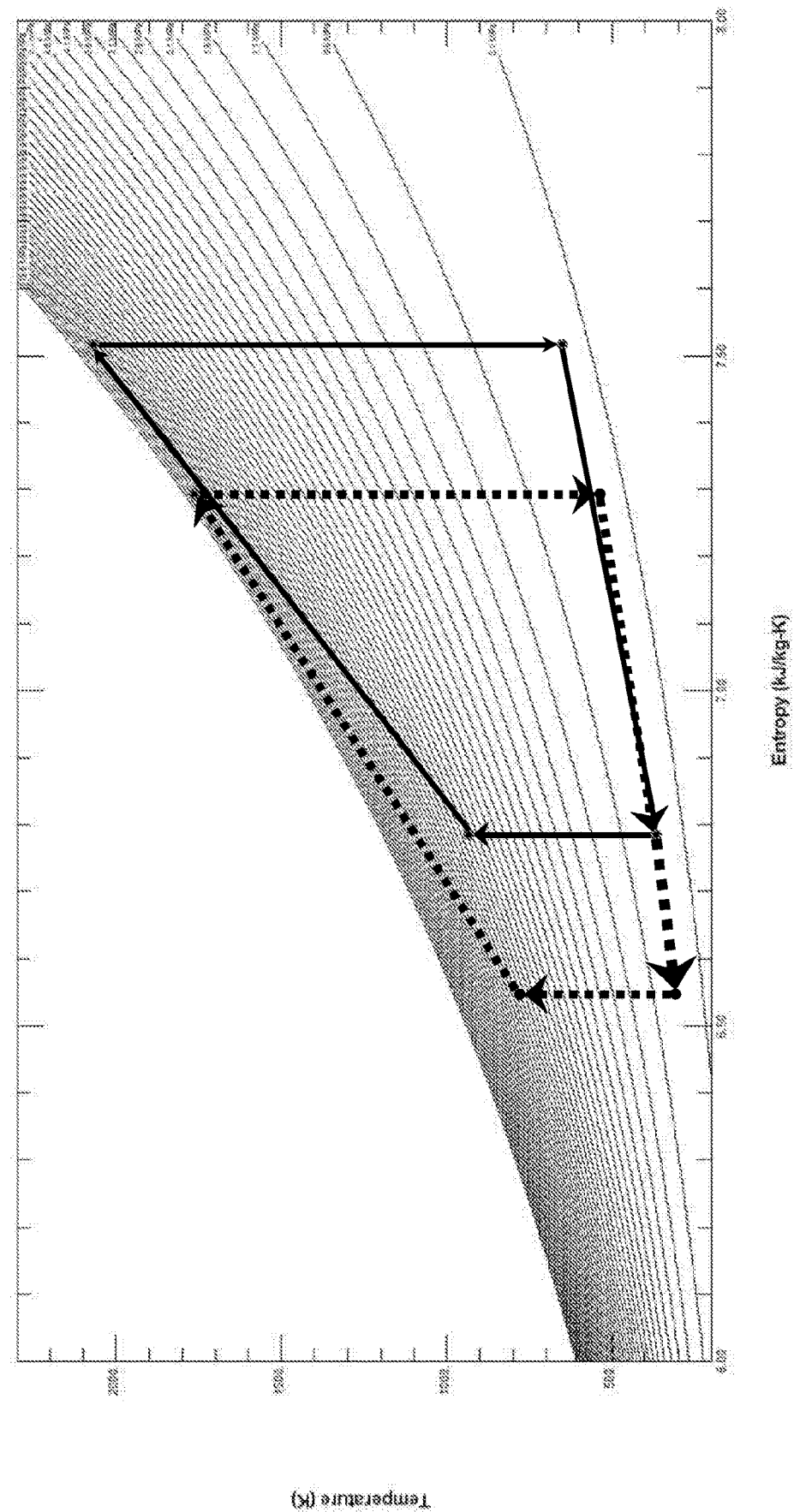
FIG. 4 shows the temperature-entropy diagram of FIG. 3 with lines of constant pressure illustrated on the graph.

FIG. 4 shows the exemplary temperature-entropy diagram for the operation of a split cycle internal combustion of FIG. 3 with lines of constant pressure added in. The lines of constant pressure illustrate that the ratio of final to initial pressures of combustion are the same for both cycles. As a result, the two cycles are operating at the same level of engine efficiency. However, as the temperature of the 'with cooling' cycle is controlled to be lower than that for the without cooling, a maximum temperature of combustion may be reduced. In turn, this may inhibit generation of NOx and/or particulates.

Figure 5:
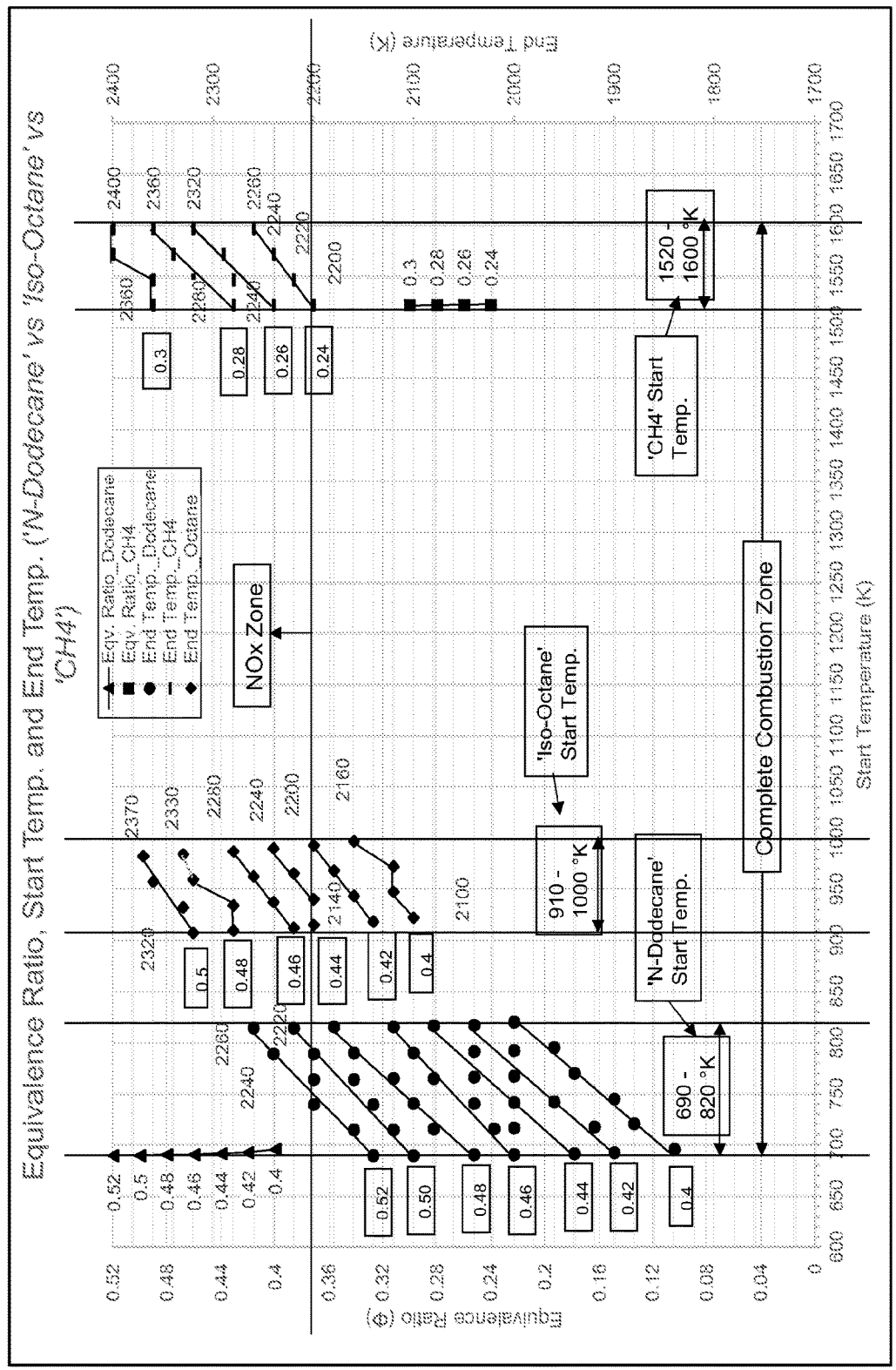
FIG. 5 shows a graph illustrating example scenarios for use of a split cycle internal combustion engine based on their equivalence ratio, start temperature and end temperature.

FIG. 5 shows a graph illustrating examples of different start temperatures for combustion mapping on to their respective final temperatures for combustion for N-Dodecane, Methane ($CH_4$) and Iso-octane. The graph also provides an indication of values for the equivalence ratio for each of these fuels at the start temperature. The graph also illustrates the region of end temperatures above with NOx generation typically occurs; the line is illustrated at a final temperature of approximately 2200 Kelvin. Typically, the value for temperature of NOx generation remains the same for the fuels discussed herein. For example, the selected threshold may be selected based on a typical value for the temperature at which NOx generation occurs. The graph also illustrates a region of start temperatures for which complete combustion of the fuel typically occurs. As illustrated, this region extends from a temperature of approximately 690 Kelvin to a temperature of approximately 1600 Kelvin. For example, the cooling threshold may be selected based on the lower value of the range in which complete combustion occurs. This is because, for start temperatures of combustion below the lower value, the combustion may be inefficient as the fuel cannot completely ignite and combust.

The graph shows that for N-Dodecane as the fuel, and with a range of start temperatures from 690 Kelvin to 820 Kelvin, complete combustion may occur without entering into a final temperature of combustion in the NOx zone. The graph shows this occurring across the range of temperatures for equivalence ratios of 0.4 to 0.48. For the equivalence ratios of 0.5 and 0.52, the final temperature of combustion may not reach the NOx zone for lower starting temperatures within the range. However, for higher starting temperatures, the final temperature of combustion may reach the NOx zone. As one example, at an equivalence ratio of 0.5 and a starting temperature of approximately 690 Kelvin, the end temperature of combustion is approximately 2100 Kelvin and not in the NOx zone. As another example, at an equivalence ratio of 0.5 and a starting temperature of 820 Kelvin, the end temperature of combustion is approximately 2220 Kelvin, and in the NOx zone. This shows that by controlling the start temperature to be within a certain range, for a given equivalence ratio, the final temperature of combustion may avoid the NOx zone, and thus may inhibit the generation of NOx.

As illustrated in the graph, the equivalence ratio is the fuel-air equivalence ratio (0). For Dodecane, at a fuel-air equivalence ratio of 0.4, the air-fuel equivalence ratio (A) is 2. The fuel-air equivalence ratio may be selected based on a leanness threshold. A leanness ratio may be defined based on the fuel-air equivalence ratio. For example, the leanness threshold may be selected based on a fuel-air equivalence ratio of be 0.4; it may be 0.42; it may be 0.44; it may be 0.46; it may be 0.48; it may be 0.5. In the event that the leanness of the fuel and working fluid mixture is below a certain value, particulate generation may occur. The leanness threshold may be selected based on the certain value. Particulate generation may comprise generation of soot in the engine. The leanness of the mixture between the working fluid and the fuel may be controlled so that the mixture is lean enough to avoid generation of particulates. Typically, particulate generation occurs as a result of 'rich zones' of fuel, where the fuel does not mix with enough oxygen and so incomplete combustion occurs. Combustion may also be controlled to avoid generation of compounds HC and CO, the presence of which typically results in ineffective combustion. The equivalence ratio may be based on a local equivalence ratio; it may be based on an average equivalence ratio for the combustion cylinder; it may be based on both.

In another aspect, the engine 100 of either of FIG. 1 or 2 may operate so that the controller 60 controls at least one thermodynamic property of the working fluid in the crossover passage 30 so that the flow of that working fluid into the combustion cylinder 20 satisfies a selected criterion. In particular, the controller 60 is configured to control at least one of the pressure and the density of the working fluid in the crossover passage 30 so that the working fluid flows into the combustion cylinder 20 at a speed greater than a speed threshold. The speed threshold is selected so that the working fluid flowing into the combustion cylinder 20 enables a lean mixing of fuel with the working fluid in the combustion cylinder 20. For instance, the working fluid may flow in through the inlet valve 18 at a speed so that it generates a large amount of turbulence and result in a fast flow of fluid past the fuel injector 82. Upon injection of fuel into the combustion cylinder 20, the fuel may be suitably dispersed as a result of the speed of the flow of the working fluid. This may reduce the number of 'pockets of fuel' which burn at a higher temperature than their surroundings, and thus it may reduce the amount of NOx and/or soot formation. This may also ensure that the fuel is completely reacted, leaving no pyrolysis products and so enabling a greater proportion of the fuel to be consumed to produce useful output.

In operation, the controller 60 is configured to receive an indication of at least one of a pressure and a density of the working fluid in the crossover passage 30. The indication may be received from the crossover sensor 31, which may be configured to measure a suitable thermodynamic parameter from which the pressure and/or density may be determined. The controller 60 may determine the pressure and/or density using a look-up table or a mathematical model which provides a mapping between the measured parameter and a corresponding value for pressure and/or density. The controller 60 is configured to compare this determined value to an input threshold. The input threshold may be a value for the measured parameter in the crossover passage which is expected to produce a flow of working fluid into the combustion cylinder at a speed greater than or equal to the speed threshold. The controller 60 is configured to control the pressure and/or density of the working fluid based on this comparison. The pressure and/or density of the working fluid are controlled so that the fluid flows into the combustion cylinder 20 at a speed greater than the speed threshold.

The speed threshold is selected to be a speed which results in a turbulent flow of fluid into, and within, the combustion cylinder 20 to provide a lean mixing of the fuel with the working fluid. A value for the speed threshold may be determined based on the pressure and/or density of the working fluid in the crossover passage 30, as well as dimensions of the combustion cylinder 20 and the inlet valve 18, which could be used to model the flow of the fluid into the combustion cylinder 20. The value for the speed threshold is therefore selected so that flow of the working fluid in to the combustion cylinder 20 at the speed threshold results in a lean mixing of fuel. Lean mixing of the fuel is selected so that complete combustion may occur and particulate generation is inhibited. Optionally the leanness may be selected so that all of the fuel does not all ignite at once, but the fuel ignition is staggered over the duration of the combustion stroke, as this may provide a more consistent output of work by the engine 100. For example, the speed threshold may be greater than 350 metres per second; it may be 345 m/s; it may be 343 m/s; it may be 340 m/s; it may be 335 m/s; it may be 330 m/s; it may be 325 m/s; it may be 320 m/s; it may be 310 m/s; it may be 300 m/s. However, it is to be appreciated that this value is dependent on different parameters of the engine and so may be considerably higher or lower. For example, pressure or density may influence the value for the speed threshold. Typically, at these speeds the flow of fluid into the combustion cylinder 20 will be choked flow, which results from a breaking of the sound barrier interfering with the flow of working fluid into the combustion cylinder 20.

The input threshold is selected based on the speed threshold and/or a selected level of turbulence within the combustion cylinder 20. For instance, the input threshold may be selected based on empirical data and/or a mathematical model which provides an indication of an associated level of turbulence within the combustion cylinder 20. The input threshold may be selected so that working fluid with a pressure and/or density at the input threshold will flow into the combustion cylinder 20 at the speed threshold.

In response to determining that the pressure and/or density of the working fluid are greater than the input threshold, the controller 60 is configured to control the pressure and/or density of working fluid. The controller 60 may control the pressure and/or density of the working fluid using the coolant system. In response to determining that the pressure and/or density are below the input threshold, the controller 60 is configured to control operation of the coolant system. This may reduce the temperature of the working fluid, which may enable a greater pressure and/or density in the crossover passage 30. For example, in an engine 100 at 973K and 7 MPa, a reduction of the temperature to 700K would yield a 40% increase in density. The extent of the operation of the coolant system may be determined based on an extent of the difference in value between the pressure and/or density of the working fluid and the input threshold. In the example of FIG. 1 and FIG. 2, the coolant system comprises a coolant injector 14 for injecting coolant into the compression cylinder 10 of the engine 100. Operation of this coolant system may comprise increasing the volume of coolant injected into the compression cylinder 10. The controller 60 may also control the volume of coolant injected based on the determined pressure and/or density of the fluid.

The increased pressure in the crossover passage 30 will create an increased pressure differential between the crossover passage 30 and the combustion cylinder 20, and so in response to the inlet valve 18 to the combustion cylinder 20 moving into the open state, the flow of working fluid into the combustion cylinder 20 will be at a greater speed. The increased density will provide an increase in the density of oxygen carrying gas in the combustion cylinder 20. Another consequence of an increased density is that an initial temperature of the working fluid in the combustion cylinder 20 is lower, and thus the likelihood of NOx generation is reduced. This increased density provides an increased mass of gas, which results in increased pressure and less temperature rise upon combustion. Thus, this also reduces the peak temperature of combustion and so inhibits NOx production.

In another aspect, the split cycle internal combustion engine 100 may operate based on selected valve timings. The valve timings comprise a timing associated with the first position during the cycle of the piston at which the inlet valve 18 moves from the closed to the open state, and the second position during the cycle of the piston at which the inlet valve 18 moves from the open to closed state. The first and second position may be fixed, so that the inlet valve 18 moves at selected positions which are not controlled by the controller 60. The controller 60 may therefore determine the input threshold based on the selected positions. This comprises determining, based on the conditions of the engine 100 at each position, a value for the input threshold so that working fluid in the crossover passage 30 at the input threshold may flow into the combustion cylinder 20 at a speed greater than the speed threshold after the inlet valve 18 has moved to the open state at the first position.

In another aspect, the split cycle internal combustion engine 100 may operate based on a control of movement of the inlet valve 18 for the combustion cylinder 20. The inlet valve 18 may move from the closed state to the open state. Movement to the open state comprises movement of the valve so that a cross-sectional area is presented to the working fluid in the crossover passage for the fluid to flow through and into the combustion cylinder 20. The inlet valve 18 may be configured to move between the closed state and a plurality of open states. The plurality of open states may comprise a series of discrete states in which a different cross-sectional area is defined; it may comprise a continuum of states in which the cross-sectional area differs continuously. The controller 60 is configured to control the movement of the inlet valve 18 so that a selected cross-sectional area is defined for the working fluid to flow through into the combustion cylinder 20.

The controller 60 is configured to control the movement of the inlet valve so that the selected cross-sectional area is defined. The controller is configured to select the selected cross-sectional area so that the working fluid in the crossover passage 30 flows through the cross-sectional area and into the combustion cylinder 20 at a speed greater than a speed threshold. The controller 60 may determine the selected cross-sectional area based on a received indication of a parameter of the engine. For example, the controller 60 may be configured to use a mathematical model (e.g. based on Bernoulli flow) to determine an estimate for the speed of fluid flow into the combustion cylinder 20. The controller 60 may determine, based on e.g. the mathematical model or a look-up table, the cross-sectional area needs to be limited to a selected cross-sectional area for the working fluid to flow into the combustion cylinder 20 at a speed below the speed threshold. The controller 60 may therefore control the inlet valve 18 to move to the open state, wherein movement to the open state comprises opening the valve, but not necessarily opening the valve to its fully-open state. Rather, the valve may be opened to a portion of its fully-open state, e.g. the inlet valve may be moved to a half-open state. The extent to which the inlet valve 18 is moved may be based on the received indication of pressure in the crossover passage 30. For example, in the event that the pressure in the crossover passage 30 is very high, the controller 60 may control the inlet valve 18 to open to its fully-open state, as even with a much greater cross-sectional area, the working fluid may still flow into the combustion cylinder 20 at a speed greater than the speed threshold. In another example, the controller 60 may determine that the pressure in the crossover passage 30 is not very high and may thus control the inlet valve 18 to open to a just-open state in which the cross-sectional area defined is very small and thus results in a much faster flow of working fluid into the combustion cylinder 20.

The controller 60 is configured to control the valve lift so that the working fluid flows into the combustion cylinder at a speed greater than a speed threshold. The speed that the working fluid flows into the combustion cylinder may be determined as a peak speed of flow, which typically will occur at, or very shortly after, opening of the inlet valve 18. This speed may be determined based on a measurement from the exhaust sensor. For example, if the exhaust sensor determines that NOx and/or particulate generation is above a threshold level then the speed of flow is too low. By controlling the movement of the inlet valve 18 so that the speed of flow of the working fluid into the combustion cylinder 20 is greater than the speed threshold, the mixing of air and fuel in the combustion cylinder may provide a leanness ratio greater than a leanness threshold. The leanness threshold may inhibit generation of particulates as the fuel and working fluid is sufficiently mixed up that each unit of fuel is provided with sufficient oxygen for complete combustion to occur, and thus for particulate generation to be inhibited. Controlling the speed of flow to be greater than a speed threshold may also reduce the stress on the fuel injector 82, because fewer requirements are placed on the fuel injector 82 with regards to mixing of the fuel and working fluid, which may prolong injector life. Additionally, running operating the inlet valve 18 to open at a low lift may reduce the time taken for the inlet valve 18 to move from its closed state to its open state as it has less far to move. This may speed up the process of getting working fluid into the combustion cylinder 20 from the crossover passage 30. As a result, the inlet vale 18 may be opened later during the cycle of the piston.

The controller 60 may determine movement of the inlet valve 18 based on data regarding the design of the inlet valve 18. For example, the dimensions of the valve may be considered, such as its shape, or surface friction levels. It is to be appreciated that the specifics of the fluid flow path from the crossover passage 30 into the combustion cylinder 20 (e.g. shape, length, diameter etc.) may influence the speed of flow. The controller 60 may access a look-up table which is specific to its inlet valve 18 when determining the cross-sectional area to be defined by the inlet valve 18 for fluid flow.

In another aspect, the split cycle internal combustion engine 100 may operate based on variable valve timings. This may comprise the controller 60 selecting the first and second position based on a determined value for the pressure and/or density of the working fluid, so that the working fluid flows into the combustion cylinder 20 at a speed greater than the speed threshold after the inlet valve 18 has moved to the open state at the selected first position.

Figure 6:
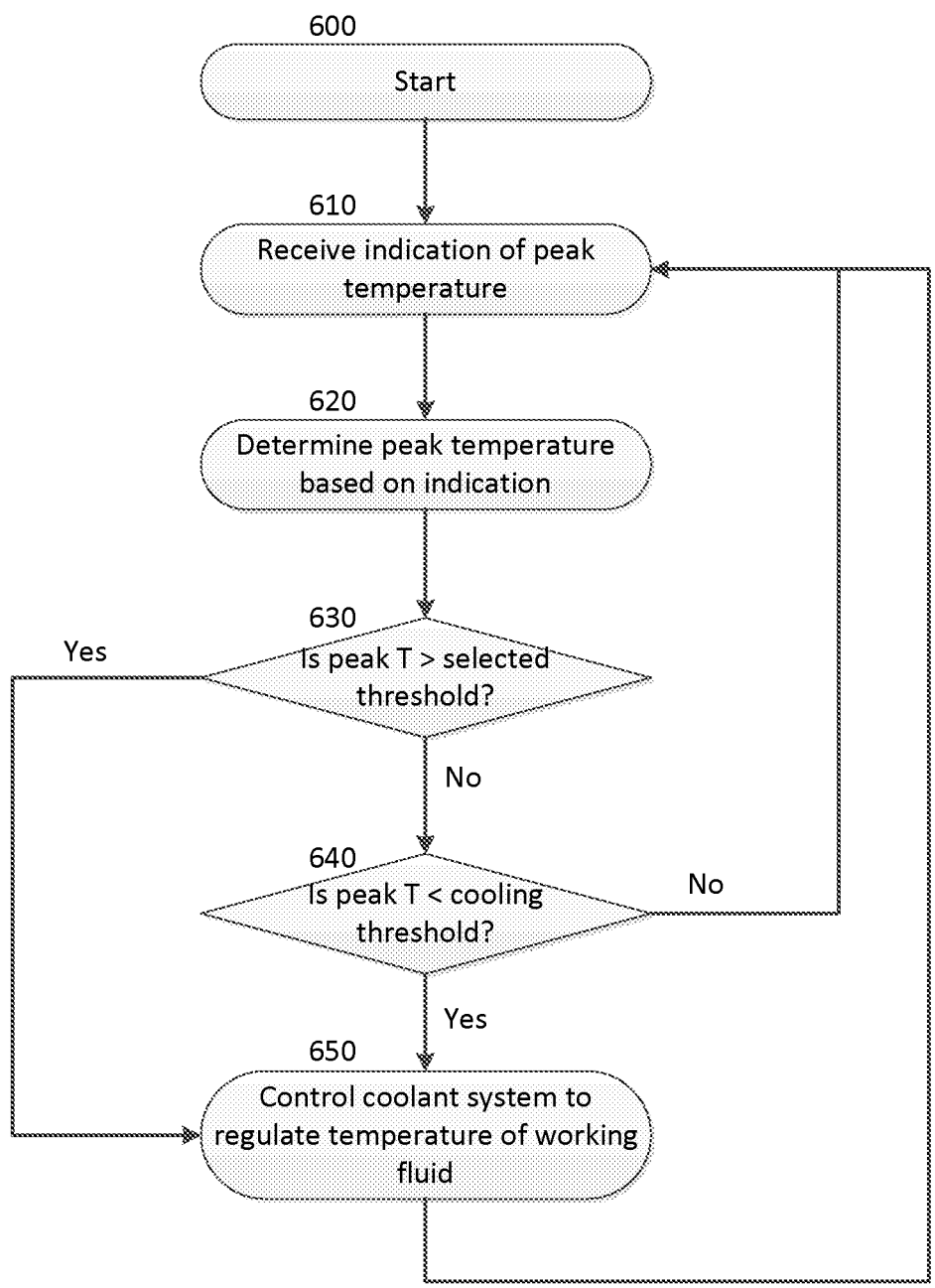
FIG. 6 shows a flow-chart illustrating an exemplary method of operation for a split cycle internal combustion engine.

A method of operation of a split cycle internal combustion engine, for example the split cycle internal combustion engine 100 of FIGS. 1 and 2, will now be described with reference to FIG. 6. At step 600, the method starts and proceeds to step 610 at which an indication of peak temperature is received. As discussed above, this indication may be received from one or more sensors, and may provide information about a parameter of the engine. At step 620, based on the indication received at step 610, a peak temperature of combustion in the combustion cylinder 200 is determined. The peak temperature may be determined as described above. At step 630, the determined peak temperature is compared against the selected threshold. In response to determining that the peak temperature is less than the selected threshold, the method proceeds to step 640, where the peak temperature is compared to a cooling threshold. At step 640, if the determined peak temperature is greater than the cooling threshold, it is determined that the peak temperature of the engine is within a suitable range. The method then loops back to the start, where another indication of peak temperature is received. The looping may occur over a variable timescale, for example indications may be received at selected time periods; the indications may be received more frequently during start-up of the engine where values for parameters of the engine will vary more. In response to determining at step 630 that the determined peak temperature is greater than the selected threshold, or at step 640 that it is less than the cooling threshold, the method proceeds to step 650. At step 650, the coolant system is controlled to regulate temperature of the working fluid based on the determined peak temperature. The temperature may be regulated with the aim of moving the peak temperature of combustion to be within the suitable range. The method then loops back to step 610. The frequency of received indications may be higher in response to the looping being from step 650 rather than step 640.

Figure 7:
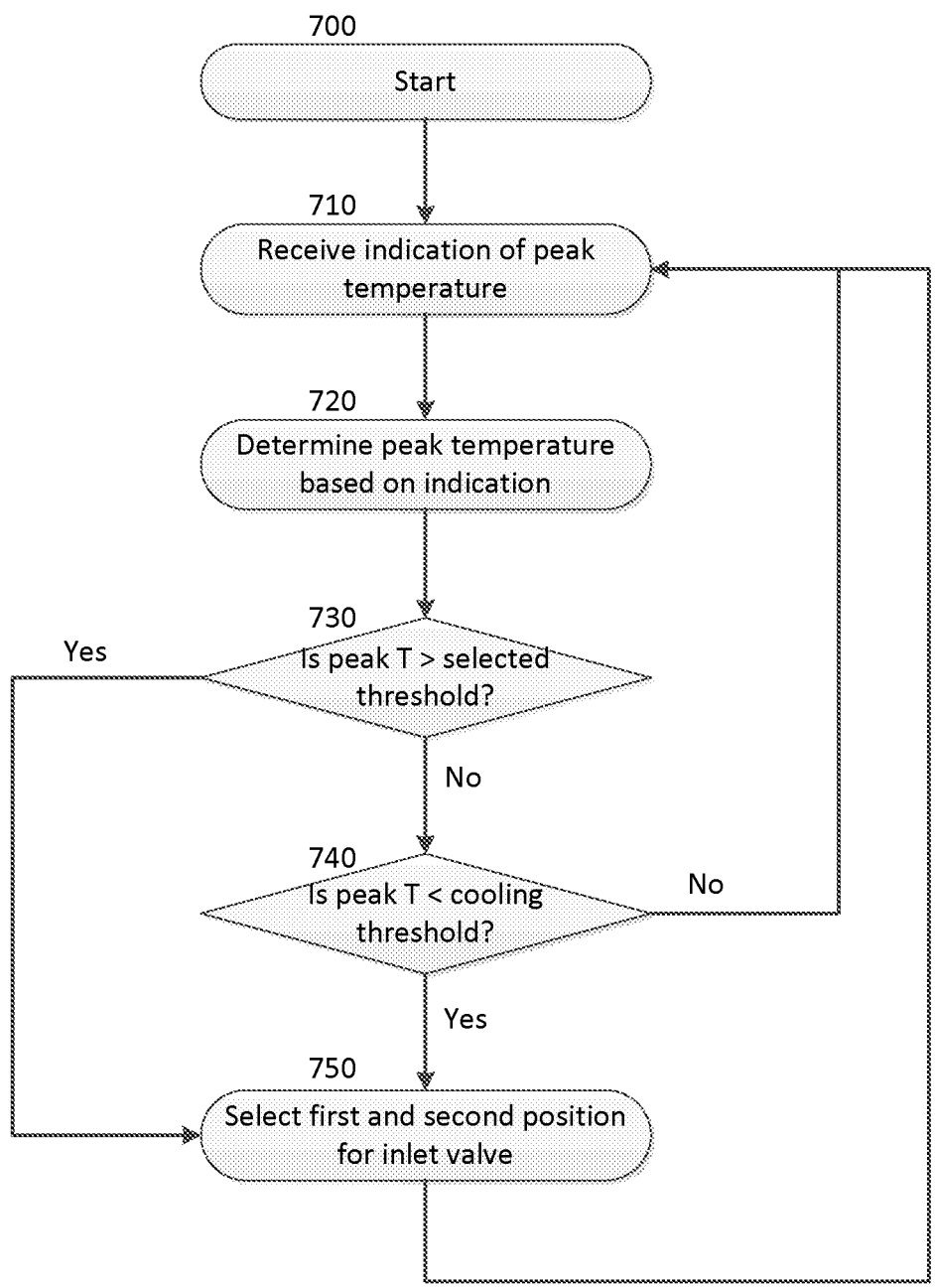
FIG. 7 shows a flow-chart illustrating an exemplary method of operation for a split cycle internal combustion engine.

A method of operation of a split cycle internal combustion engine, for example the split cycle internal combustion engine 100 of FIGS. 1 and 2, will now be described with reference to FIG. 7. Steps 700 to 740 of the method correspond to steps 600 to 640 respectively of FIG. 6 described above and so are not described again. At step 750, in response to the determined peak temperature being greater than the selected threshold, or the determined peak temperature being less than the cooling threshold, the first and second positions for the respective opening and closing of the inlet valve are selected to regulate the temperature of the working fluid. The temperature of the working fluid may be regulated with the aim of moving the peak temperature of combustion to be within a suitable range (e.g. between cooling threshold and selected threshold).

Figure 8:
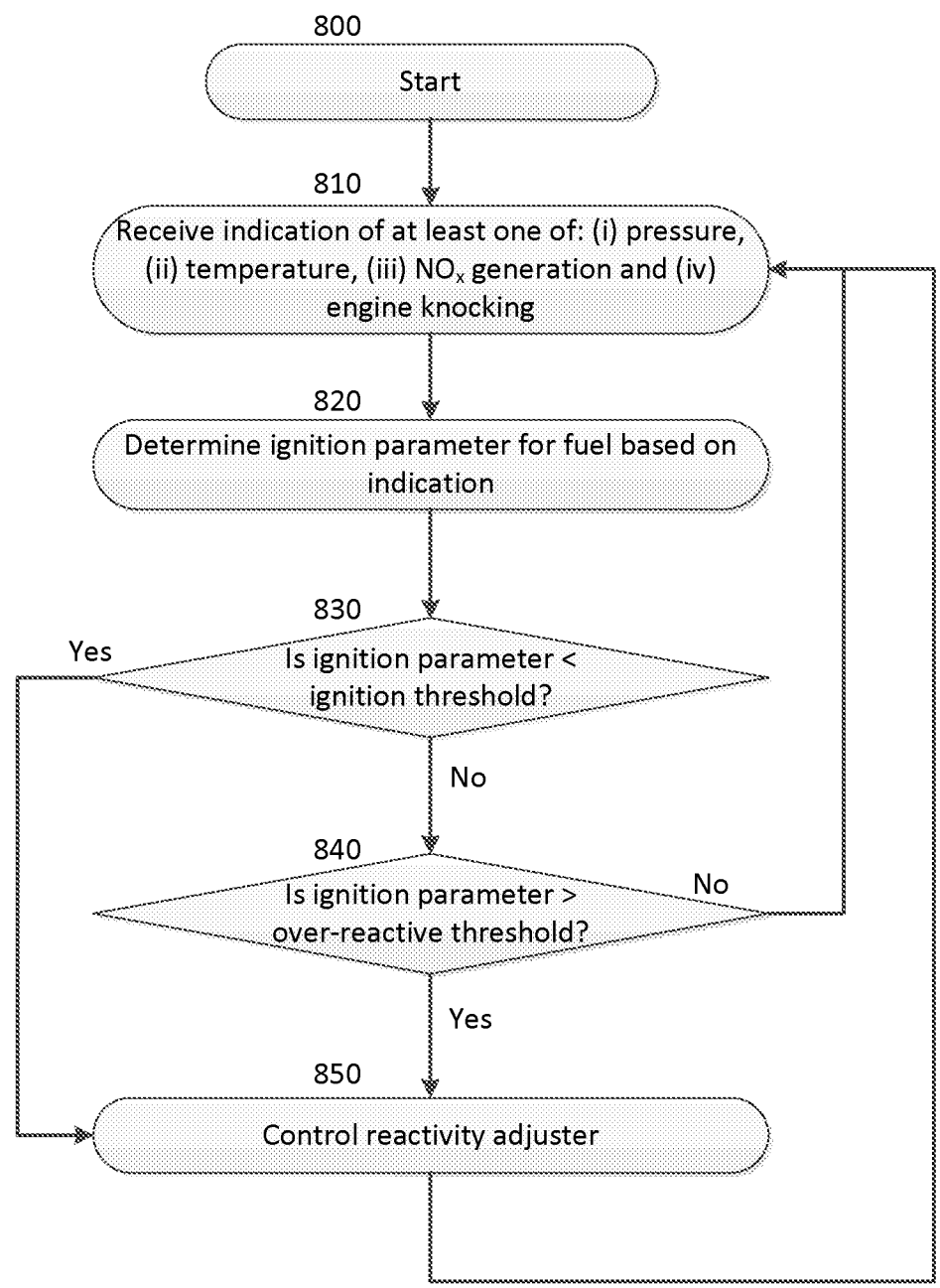
FIG. 8 shows a flow-chart illustrating an exemplary method of operation for a split cycle internal combustion engine.

A method of operation of a split cycle internal combustion engine, for example the split cycle internal combustion engine 100 of FIGS. 1 and 2, will now be described with reference to FIG. 8. At step 800, the method starts and proceeds to step 810, where an indication of an engine parameter is received. At step 820, an ignition parameter for the fuel is determined based on the indication received at step 810. The ignition parameter may be determined as described above. At step 830, the ignition parameter is compared to an ignition threshold. In response to determining that the ignition parameter is greater than the ignition threshold, the method proceeds to step 840 where the ignition parameter is compared to an over-reactive threshold. In response to the ignition parameter being less than the over-reactive threshold, the ignition parameter is considered to be within a suitable range and the method loops back to step 810; this looping may be as described above. In response to the ignition parameter being either less than the ignition threshold or greater than the over-reactive threshold, the method proceeds to step 850 where the reactivity adjuster is operated, for example to adjust the working fluid so that the reactivity is within the suitable range for operation of the engine.

Figure 9:
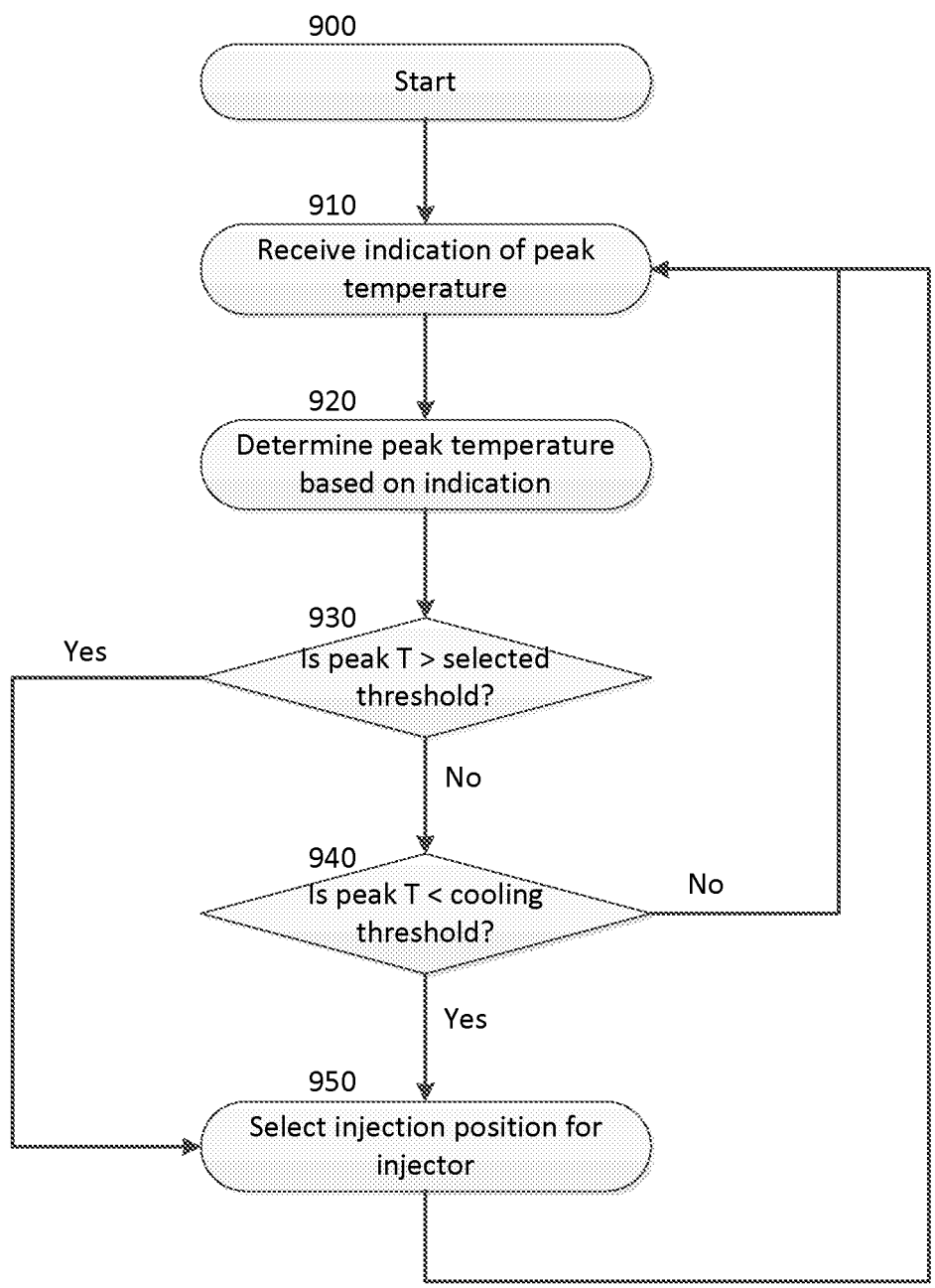
FIG. 9 shows a flow-chart illustrating an exemplary method of operation for a split cycle internal combustion engine.

A method of operation of a split cycle internal combustion engine, for example the split cycle internal combustion engine 100 of FIGS. 1 and 2, will now be described with reference to FIG. 9. Steps 900 to 940 of the method correspond to steps 600 to 640 respectively of FIG. 6 described above and so are not described again. At step 950, in response to the determined peak temperature being greater than the selected threshold, or the determined peak temperature being less than the cooling threshold, an injection position for the injector is selected. The injection position is selected to regulate the temperature of the working fluid as described above.

Figure 10:
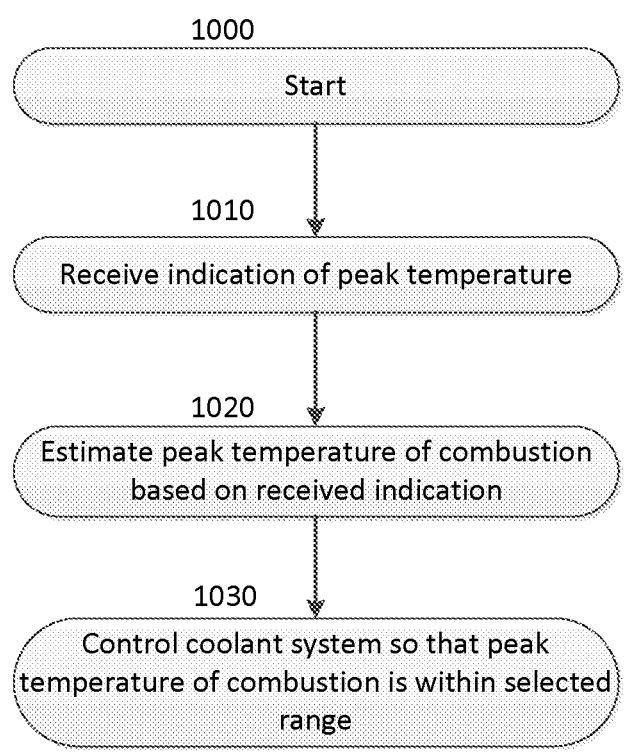
FIG. 10 shows a flow-chart illustrating an exemplary method of operation for a split cycle internal combustion engine.

A method of operation of a split cycle internal combustion engine, for example the split cycle internal combustion engine 100 of FIGS. 1 and 2, will now be described with reference to FIG. 10. At step 1000, the method starts and proceeds to step 1010 where an indication of peak temperature is received. An estimate for the peak temperature of combustion may be determined, as described above, based on the indication received at step 1010. At step 1030, the coolant system is controlled so that a peak temperature of combustion is within a selected range. This step may comprise, increasing and or decreasing cooling of the working fluid based on whether the peak temperature of combustion low or high with respect to the selected range.

Figure 11:
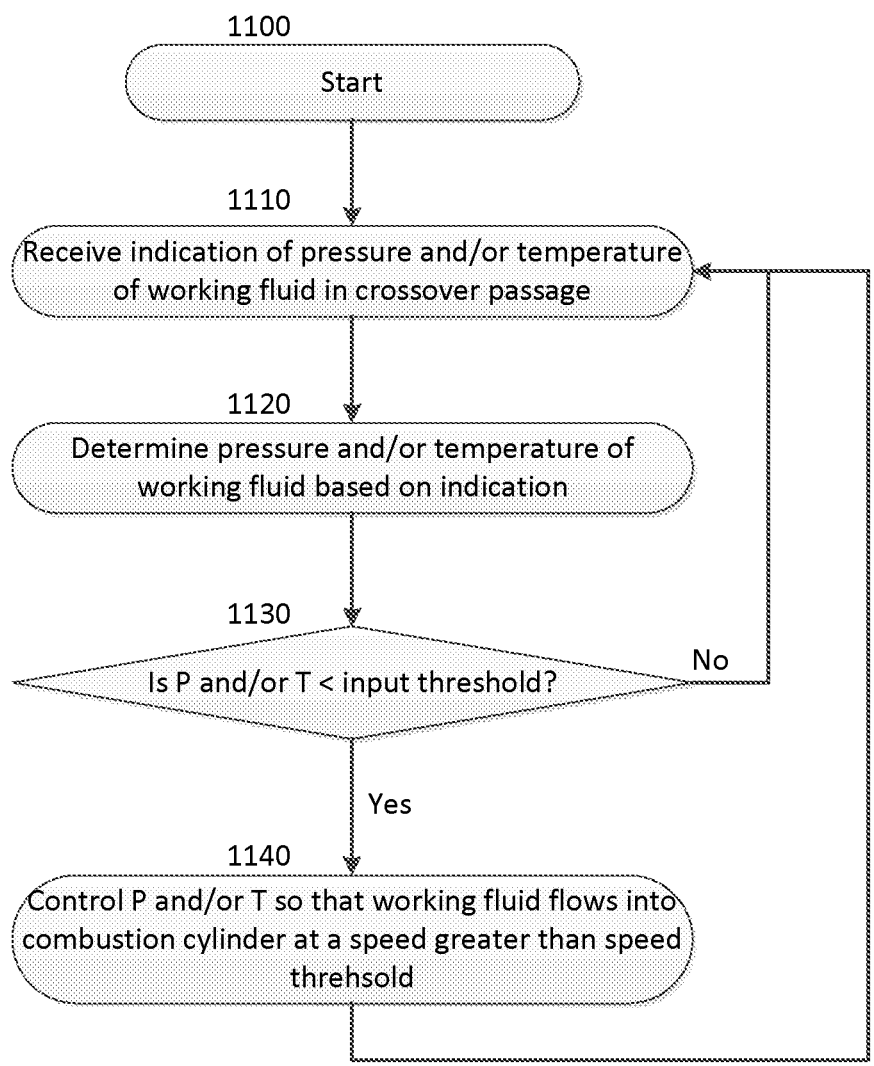
FIG. 11 shows a flow-chart illustrating an exemplary method of operation for a split cycle internal combustion engine.

A method of operation of a split cycle internal combustion engine, for example the split cycle internal combustion engine 100 of FIGS. 1 and 2, will now be described with reference to FIG. 11. At step 1100, the method starts and proceeds to step 1110 where an indication of an engine parameter is received. At step 1120, based on this indication of the engine parameter, a value for an engine parameter (in the example of FIG. 11, a pressure and/or temperature) may be determined. This determination will be dependent on what is comprised within the indication. It may comprise use of a thermodynamic relation to process a value for one engine parameter to determine a value for another (a pressure or a temperature). At step 1130, the determined parameter (pressure and/or temperature) is compared to an input threshold. In response to the parameter being greater than the input threshold, the working fluid is considered to be suitable for use in the combustion cylinder, and the method loops back to 1110. In response to the parameter not being greater than the input threshold, the method proceeds to step 1140 where the parameter (pressure/temperature) of the working fluid is controlled so that it may be in a suitable range for the working fluid to flow into the combustion cylinder 20 at a speed greater than the speed threshold. The method then loops back to step 1110.

Figure 12:
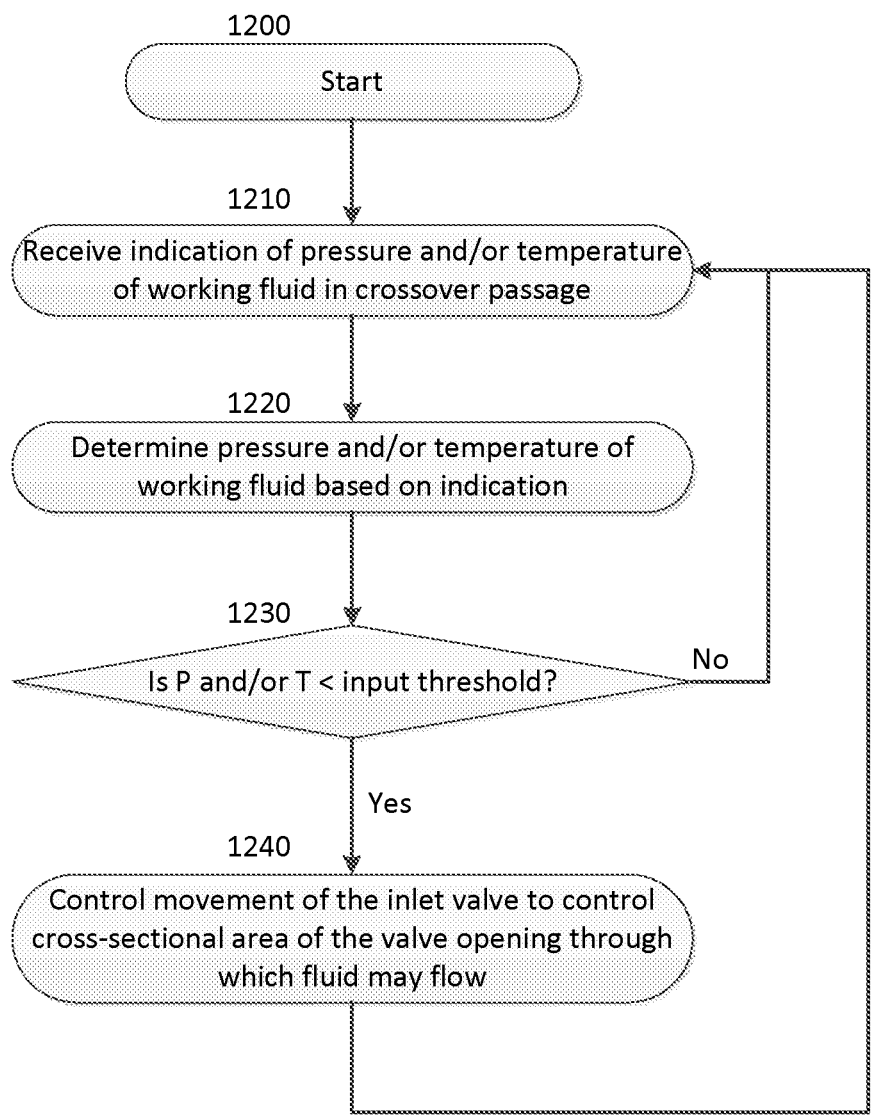
FIG. 12 shows a flow-chart illustrating an exemplary method of operation for a split cycle internal combustion engine.

A method of operation of a split cycle internal combustion engine, for example the split cycle internal combustion engine 100 of FIGS. 1 and 2, will now be described with reference to FIG. 12. Steps 1200 to 1230 of the method correspond to steps 1100 to 1130 respectively of FIG. 11 described above and so are not described again. At step 1240, the movement of the inlet valve is controlled to define a cross-sectional area of the inlet valve opening through which working fluid flows from the crossover passage 30 into the combustion cylinder 20. The cross-sectional area is selected, as described above, so that the working fluid flows into the combustion cylinder 20 at a speed greater than a speed threshold.

It is to be appreciated that whilst the description has been directed towards $NO_R$, the term NOx may be considered to encompass any suitable Nitrogen Oxide compound, for example $N_2O$, or any other combination of Nitrogen and Oxygen. It is not to be construed as limited directly to compounds containing a single Nitrogen atom.

It is to be appreciated that the cycle of the piston is cyclical and recurring and so reference to occurrence later in the cycle of the piston may refer to occurrence at a later time. Each cycle of the piston may be considered to commence with the combustion piston 22 at its bottom dead centre ('BDC') position. During the cycle of the piston, the combustion piston 22 then proceeds to move from its BDC position to its top dead centre ('TDC') position, before returning back to its BDC position. Thus, discussion of, for example the injector injecting fuel at an earlier/later position during the cycle of the piston or the inlet valve opening and closing at an earlier/later position during the cycle of the piston, is based on the cycle of the piston moving from BDC to BDC.

With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The activities and apparatus outlined herein may be implemented with fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof.

It will be appreciated from the discussion above that the embodiments shown in the Figures are merely exemplary, and include features which may be generalised, removed or replaced as described herein and as set out in the claims. In the context of the present disclosure other examples and variations of the apparatus and methods described herein will be apparent to a person of skill in the art.

The invention claimed is:

1. A recuperated split cycle internal combustion engine comprising:
 a compression cylinder accommodating a compression piston;
 a combustion cylinder accommodating a combustion piston;
 a crossover passage between the compression cylinder and the combustion cylinder arranged to provide compressed working fluid from the compression cylinder to the combustion cylinder;
 a controller arranged to determine a peak temperature of combustion in the combustion cylinder based on a received indication of a peak temperature of combustion in the combustion cylinder; and
 a coolant system arranged to regulate a temperature of the compressed working fluid supplied to the combustion cylinder from the compression cylinder through the crossover passage;
 wherein the engine is a recuperated split cycle internal combustion engine having a recuperator arranged to heat compressed working fluid as the compressed working fluid flows from the compression cylinder to the combustion cylinder through the crossover passage;
 wherein the recuperator is arranged to recover heat from fluid exhausted from the combustion cylinder and to use this recovered heat to heat the compressed working fluid as the compressed working fluid flows from the compression cylinder to the combustion cylinder through the crossover passage; and
 wherein, in response to determining that the peak temperature of combustion exceeds a selected threshold, the controller is configured to control the coolant system to regulate the temperature of the compressed working fluid supplied to the combustion cylinder from the compression cylinder through the crossover passage so that a peak temperature of combustion in the combustion cylinder is less than the selected threshold.

2. The recuperated split cycle internal combustion engine of claim 1, wherein regulating the temperature of the compressed working fluid supplied to the combustion cylinder from the compression cylinder through the crossover passage comprises cooling working fluid in at least one of the compression cylinder and the crossover passage.

3. The recuperated split cycle internal combustion engine of claim 1, wherein regulating a temperature of the compressed working fluid supplied to the combustion cylinder from the compression cylinder through the crossover passage so that a peak temperature of combustion in the combustion cylinder is less than the selected threshold comprises regulating an intake temperature of the compressed working fluid in the crossover passage as the compressed working fluid flows from the compression cylinder to the combustion cylinder so that it is less than an intake threshold.

4. The recuperated split cycle internal combustion engine of claim 3, wherein the intake threshold is selected based on the selected threshold, so that the intake threshold is less than the selected threshold.

5. The recuperated split cycle internal combustion engine of claim 1, wherein the coolant system comprises a coolant injector for injecting coolant into at least one of the compression cylinder and the crossover passage.

6. The recuperated split cycle internal combustion engine of claim 5, wherein regulating the temperature of the compressed working fluid supplied to the combustion cylinder from the compression cylinder through the crossover passage comprises injecting coolant into at least one of: the compression cylinder and the crossover passage.

7. The recuperated split cycle internal combustion engine of claim 1, wherein the engine comprises an exhaust sensor for providing an indication of temperature in an exhaust outlet of the combustion cylinder, and wherein the received indication of peak temperature is based on a signal from the exhaust sensor.

8. The recuperated split cycle internal combustion engine of claim 1, wherein the engine comprises a supply sensor for providing an indication of temperature of compressed working fluid supplied to the combustion cylinder from the compression cylinder through the crossover passage, and wherein the received indication of peak temperature is based on a signal received from the supply sensor.

9. The recuperated split cycle internal combustion engine of claim 8, wherein the supply sensor comprises a sensor in the crossover passage.

10. The recuperated split cycle internal combustion engine of claim 1, wherein determining the peak temperature of combustion in the combustion cylinder comprises identifying an estimated value for the peak temperature of combustion based on at least one parameter associated with the engine and at least one signal received from a sensor.

11. The recuperated split cycle internal combustion engine of claim 10, wherein the at least one parameter comprises at least one of: (i) a demand on the engine, (ii) a timer indicative of the duration of time for which the engine has been running, and (iii) a temperature of the engine.

12. The recuperated split cycle internal combustion engine of claim 10, wherein the controller is configured to determine the peak temperature of combustion based on previous peak temperature of combustion data for an engine associated with the at least one parameter.

13. The recuperated split cycle internal combustion engine of claim 1, wherein regulating the temperature of the compressed working fluid supplied to the combustion cylinder from the compression cylinder through the crossover passage comprises:
  in response to determining that the peak temperature of combustion exceeds the selected threshold, controlling the coolant system to increase cooling of the compressed working fluid supplied to the combustion cylinder from the compression cylinder through the crossover passage.

14. The recuperated split cycle internal combustion engine of claim 1, wherein regulating the temperature of the compressed working fluid supplied to the combustion cylinder from the compression cylinder through the crossover passage comprises:
  in response to determining that the peak temperature of combustion is below a cooling threshold lower than the selected threshold, controlling the cooling system to decrease cooling of the compressed working fluid supplied to the combustion cylinder from the compression cylinder through the crossover passage.

15. The recuperated split cycle internal combustion engine of claim 1, wherein a temperature of the selected threshold is selected to inhibit $NO_x$ and/or particulate generation.

16. The recuperated split cycle internal combustion engine of claim 1, wherein the selected threshold is less than the point of $NO_x$ generation.

17. The recuperated split cycle internal combustion engine of claim 1, wherein the controller is configured to receive an indication of at least one of: (i) a pressure of the compressed working fluid supplied to the combustion cylinder from the compression cylinder through the crossover passage, (ii) a temperature of the compressed working fluid supplied to the combustion cylinder from the compression cylinder through the crossover passage, (iii) timings associated with opening and closing of an inlet valve for allowing the compressed working fluid to flow into the combustion cylinder from the crossover passage, and (iv) a timing of fuel injection into the combustion cylinder, and
  wherein the controller is configured to determine the peak temperature of combustion based on said received indication.

18. The recuperated split cycle internal combustion engine of claim 1, wherein the controller is configured to control at least one of: (i) a pressure of the compressed working fluid supplied to the combustion cylinder from the compression cylinder through the crossover passage, (ii) a temperature of the compressed working fluid supplied to the combustion cylinder from the compression cylinder through the crossover passage, (iii) timings associated with opening and closing of an inlet valve for allowing the compressed working fluid to flow into the combustion cylinder from the crossover passage, and (iv) a timing of fuel injection into the combustion cylinder so that the peak temperature of combustion in the combustion cylinder is less than the selected threshold.

19. A method of controlling a recuperated split cycle internal combustion engine comprising:
  a compression cylinder accommodating a compression piston;
  a combustion cylinder accommodating a combustion piston;
  a crossover passage between the compression cylinder and the combustion cylinder arranged to provide compressed working fluid to the combustion cylinder from the compression cylinder;
  a coolant system arranged to regulate a temperature of the compressed working fluid supplied to the combustion cylinder from the compression cylinder through the crossover passage; and
  a recuperator arranged to heat compressed working fluid as the compressed working fluid flows from the compression cylinder to the combustion cylinder through the crossover passage;
  wherein the method comprises:
  receiving an indication of a peak temperature of combustion in the combustion cylinder;
  determining, based on the received indication, a peak temperature of combustion in the combustion cylinder;
  in response to determining that the peak temperature of combustion exceeds a selected threshold, controlling the coolant system to regulate the temperature of the compressed working fluid supplied to the combustion cylinder from the compression cylinder through the crossover passage so that a peak temperature of combustion in the combustion cylinder is less than the selected threshold; and
  wherein heating the compressed working fluid as the compressed working fluid flows from the compression cylinder to the combustion cylinder through the crossover passage comprises using the recuperator to recover heat from fluid exhausted from the combustion cylinder and using this recovered heat to heat the compressed working fluid as the compressed working fluid flows from the compression cylinder to the combustion cylinder through the crossover passage.

20. A non-transitory computer-readable storage medium storing instructions executable by one or more processors for performing the method of claim 19.

* * * * *